United States Patent
Kawamura

(10) Patent No.: US 9,955,130 B2
(45) Date of Patent: Apr. 24, 2018

(54) IMAGE DISPLAY CONTROL DEVICE, IMAGE DISPLAY SYSTEM, AND IMAGE DISPLAY CONTROL METHOD

(71) Applicant: Panasonic Intellectual Property Management Co., Ltd., Osaka (JP)

(72) Inventor: Ryo Kawamura, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 177 days.

(21) Appl. No.: 15/064,135

(22) Filed: Mar. 8, 2016

(65) Prior Publication Data
US 2016/0286181 A1    Sep. 29, 2016

(30) Foreign Application Priority Data
Mar. 27, 2015    (JP) .................................. 2015-067568

(51) Int. Cl.
| | |
|---|---|
| G09G 5/00 | (2006.01) |
| H04N 9/31 | (2006.01) |
| G06T 3/60 | (2006.01) |
| G06F 3/01 | (2006.01) |
| G06F 3/042 | (2006.01) |

(52) U.S. Cl.
CPC ........... *H04N 9/3179* (2013.01); *G06F 3/011* (2013.01); *G06F 3/0425* (2013.01); *G06T 3/60* (2013.01); *G06F 2203/012* (2013.01)

(58) Field of Classification Search
None
See application file for complete search history.

(56) References Cited

U.S. PATENT DOCUMENTS

| | | | |
|---|---|---|---|
| 9,494,970 B2* | 11/2016 | Truong | ................. G06F 3/0487 |
| 2010/0153003 A1* | 6/2010 | Merkel | ................. G01C 21/20 |
| | | | 701/533 |

FOREIGN PATENT DOCUMENTS

JP    2010-146827 A    7/2010

* cited by examiner

*Primary Examiner* — Peter Hoang
(74) *Attorney, Agent, or Firm* — McDermott Will & Emery LLP

(57) ABSTRACT

An image display control device for displaying an image that is easy to view for a person is provided. The image display control device includes: an entry detector that detects, based on an image captured by an imaging device, an entry position through which a person entered a range of imaging; an entry direction identifying unit that identifies, based on the detected entry position and a center position of a region including a range of projection by a projecting device, an entry direction in which the person entered the range of imaging; a renderer that performs on an image data item a rotational rendering process in which an image to be projected by the projecting device is rotated according to the identified entry direction; and an output unit that outputs to the projecting device the image data item on which the rotational rendering process has been performed.

16 Claims, 35 Drawing Sheets

RANGE OF IMAGING

RANGE OF PROJECTION   RANGE OF IMAGING   REGION (REGION ENCLOSED BY CIRCUMFERENCE OF RANGE OF IMAGING)

IMAGE DISPLAY CONTROL DEVICE, IMAGE DISPLAY SYSTEM, AND IMAGE DISPLAY CONTROL METHOD

CROSS REFERENCE TO RELATED APPLICATION

This application claims the benefit of priority of Japanese Patent Application Number 2015-067568 filed on Mar. 27, 2015, the entire content of which is hereby incorporated by reference.

BACKGROUND

1. Technical Field

The present disclosure relates to an image display control device and an image display system for displaying an image.

2. Description of the Related Art

Conventionally, an illumination system for shop has been proposed in which content of information to be displayed on a display is changed based on the result of detection by a human detection sensor (refer to PTL (Patent Literature) 1: Japanese Unexamined Patent Application Publication No. 2010-146827). When this illumination system for shop determines that there are many people based on the result of detection by the human detection sensor, the illumination system for shop displays, for example, predetermined shop advertisement information. On the other hand, when the illumination system determines that there are few people, the illumination system for shop displays information geared toward passersby, such as roughly categorized product information. With this, it is possible to more effectively induce the passersby who pass by an entrance of the shop.

A problem with the above illumination system for shop disclosed in PTL 1 is, however, being unable to display an image that is easy to view for a person. This means that this system merely changes content of information according to the number of detected persons and is unable to present an image including such information that is sufficiently easy to view for those persons.

Therefore, an object of the present disclosure is to provide an image display control device and an image display system for displaying an image that is easy to view for a person.

SUMMARY

In order to achieve the aforementioned object, an image display control device according to one aspect of the present disclosure is an image display control device for displaying an image using a projecting device and an imaging device, the projecting device obtaining an image data item and projecting onto a projection surface an image represented by the image data item, the imaging device capturing an image of at least a part of a region on the projection surface as a range of imaging, the region including a range of projection in which the image appears, the image display control device including: a processor; and a non-transitory memory having stored thereon executable instructions, which when executed by the processor, cause the processor to: detect, based on the image captured by the imaging device, an entry position through which a person entered the range of imaging; identify, based on the detected entry position and a center position of the region, an entry direction in which the person entered the range of imaging; perform on the image data item a rotational rendering process in which the image to be projected by the projecting device is rotated according to the identified entry direction; and output to the projecting device the image data item on which the rotational rendering process has been performed.

According to the present disclosure, it is possible to display an image that is easy to view for a person.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

Hereinafter, an embodiment is described with reference to the drawings. Note that the embodiment described below shows a preferred specific example of the present disclosure. Therefore, the numerical values, shapes, materials, structural elements, arrangement and connection of the structural elements, steps, the processing order of the steps etc., shown in the following embodiment are mere examples, and are not intended to limit the present disclosure. Consequently, among the structural elements in the following embodiment, structural elements not recited in any one of the independent claims which indicate the broadest concepts of the present disclosure are described as arbitrary structural elements that are included in a more preferred embodiment.

Note that the respective figures are schematic diagrams and are not necessarily precise illustrations. Additionally, substantially the same structural elements in the figures share the same reference signs, and description that would overlap may be omitted or simplified.

Embodiment

Figure 1:
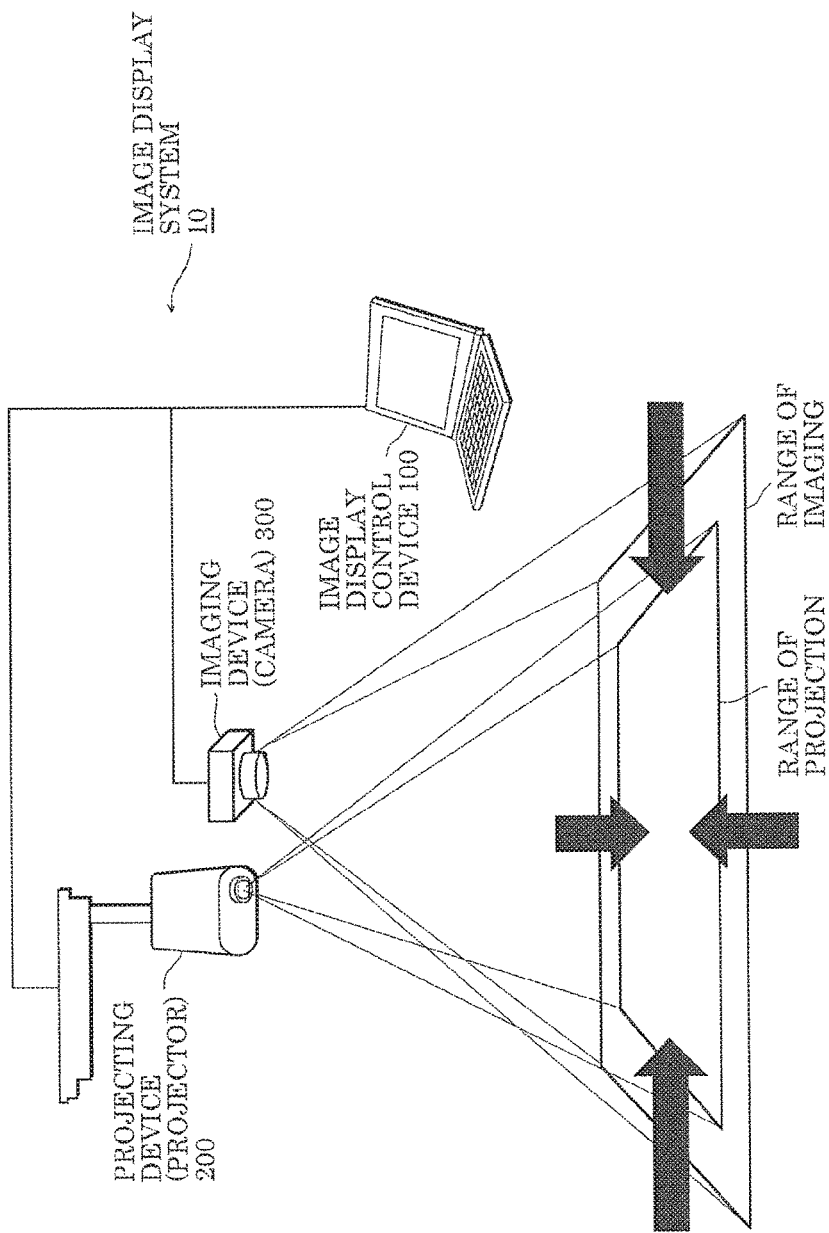
FIG. 1 illustrates a configuration of an image display system according to an embodiment.

FIG. 1 illustrates a configuration of an image display system according to an embodiment.

Image display system 10 according to an embodiment includes image display control device 100, projecting device 200, and imaging device 300.

Projecting device 200 is what is called a projector and is connected to image display control device 100. Projecting device 200 receives image data from image display control device 100, and projects onto a projection surface an image represented by the image data. For example, projecting device 200 is provided on a ceiling of a facility and projects an image onto a floor surface facing the ceiling, which serves as the projection surface. Note that the projection surface is not limited to a floor surface and may be a surface of a table, etc.

Imaging device 300 is what is called a camera and is connected to image display control device 100. Imaging device 300 captures an image of, as a range of imaging, at least a part of a region on the above-mentioned projection surface that includes a range of projection in which an image appears. For example, imaging device 300 is provided on the ceiling of the facility, next to projecting device 200, and captures, as the range of imaging, the entirety of the region including the range of projection. Imaging device 300 then transmits the captured image (hereinafter referred to as a camera image) to image display control device 100. Note that the camera image is a live image and is transmitted at a frame rate that is set in imaging device 300.

Image display control device 100 is, for example, a personal computer. Image display control device 100 obtains a camera image from imaging device 300. Then, image display control device 100 identifies, based on the camera image, an entry direction in which a person entered the range of imaging.

Furthermore, image display control device 100 outputs, to projecting device 200, image data representing an image to be projected by projecting device 200. In this regard, after identifying an entry direction in which a person entered the range of imaging, image display control device 100 rotates, according to the entry direction, an image to be projected by projecting device 200. By doing so, no matter which direction a person entered the range of imaging in, an image to be projected can be properly oriented in relation to the person. For example, an image to be projected can be arranged right-side-up in front of the person.

Figure 2:
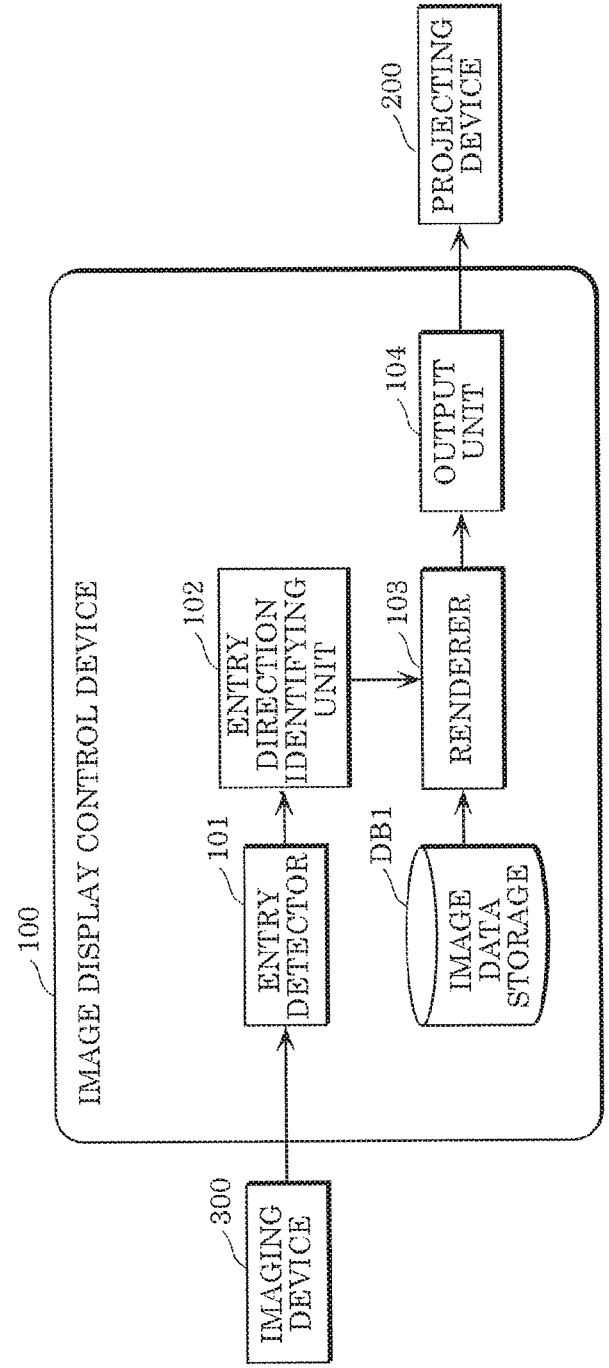
FIG. 2 is a block diagram illustrating an example of a configuration of an image display control device according to an embodiment.

FIG. 2 is a block diagram illustrating an example of a configuration of image display control device 100 according to an embodiment.

Image display control device 100 includes entry detector 101, entry direction identifying unit 102, image data storage DB1, renderer 103, and output unit 104.

Image data storage DB1 is a recording medium that holds one or more image data items. Note that these image data items may be, for example, data generated by application software of image display control device 100 or data generated by another device and stored in image data storage DB1.

Entry detector 101 detects, based on the camera image captured by imaging device 300, an entry position through which a person entered a range of imaging.

Entry direction identifying unit 102 identifies, based on the entry position detected by entry detector 101 and a center position of the region including the range of projection, an entry direction in which the person entered the range of imaging.

Renderer 103 performs on the image data item a rotational rendering process in which an image to be projected by projecting device 200 is rotated according to the entry direction identified by entry direction identifying unit 102. This image data item is data read from image data storage DB1. Thus, renderer 103 reads an image data item from image data storage DB1 and performs the rotational rendering process on the image data item.

Output unit 104 outputs, to projecting device 200, the image data item on which the rotational rendering process has been performed by renderer 103.

Figure 3:
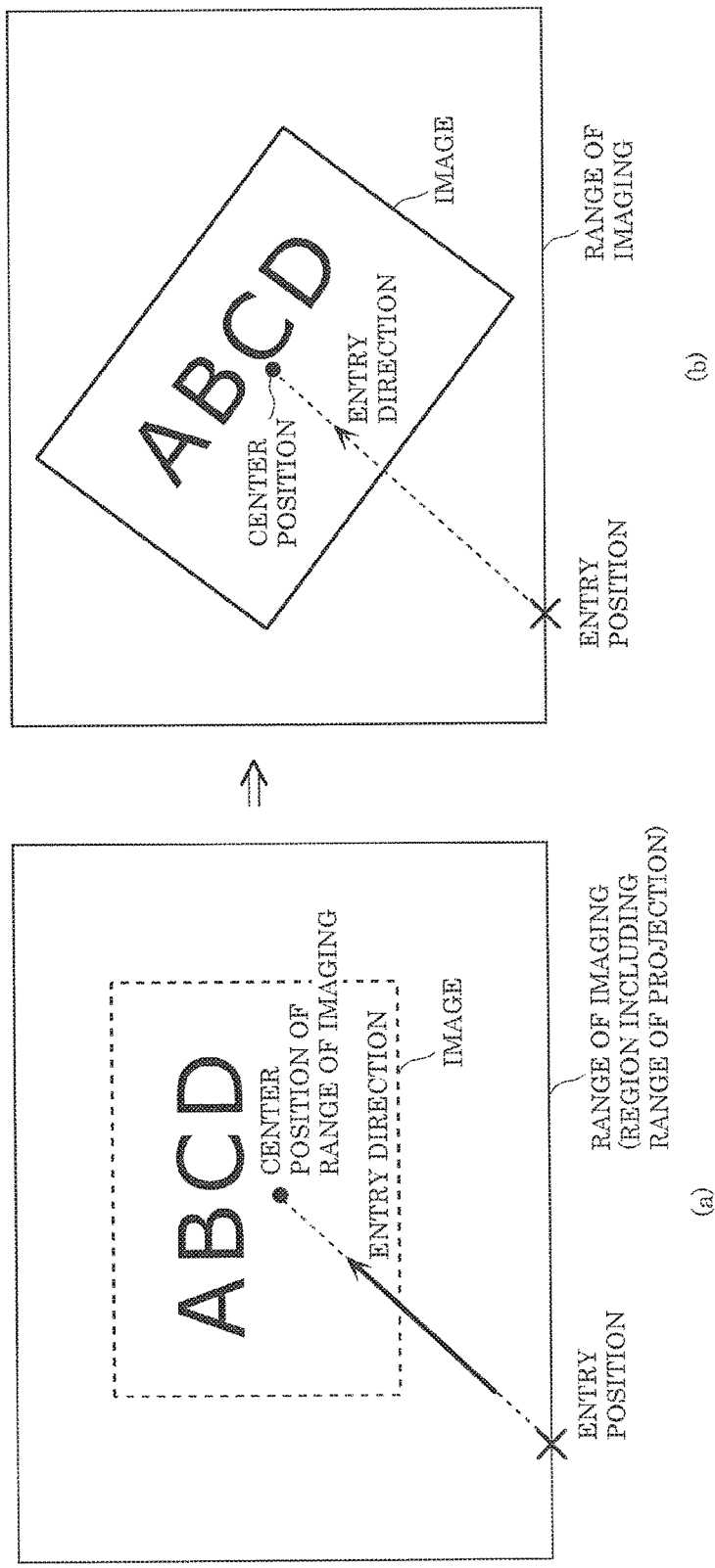
FIG. 3 illustrates an example of an entry direction that is identified and a rotational rendering process according to an embodiment.

FIG. 3 illustrates an example of the entry direction that is identified and the rotational rendering process according to an embodiment.

As illustrated in (a) of FIG. 3, entry detector 101 detects an entry position through which a person entered a range of imaging based on the camera image captured of the range of imaging. Specifically, entry detector 101 detects, as the entry position, a position at which a person appeared on the edge of the range of imaging. For example, entry detector 101 performs motion estimation using a change in luminance or a difference between captured images, and recognizes, as a person, an image region in which a motion is detected.

Entry direction identifying unit 102 identifies, as the entry direction, a center direction extending from the entry position toward the center position of the region including the range of projection, that is, the range of imaging, for example. Such a center direction is calculated based on coordinates of the entry position and coordinates of the center position.

As illustrated in (b) of FIG. 3, renderer 103 performs on the image data item a rotational rendering process in which an image to be projected by projecting device 200 is rotated according to the entry direction. For example, renderer 103 performs the rotational rendering process to arrange an image right-side-up in front of a person who is heading in the entry direction. Specifically, renderer 103 performs such a rotational rendering process on the image data item for an image that an arrangement of letters in a string of characters "ABCD" to be displayed in the image is orthogonal to the entry direction. Note that this rotational rendering process may be a process of rotating a projected image or a process of rotating an image that is to be projected. The image that is to be projected means an image that has not been projected yet at the time of detection of the entry position and begins to be projected according to such detection. Furthermore, the rotational rendering process is, for example, arithmetic processing involving a rotation matrix according to which coordinates of each pixel represented by an image data item are displaced.

Figure 4:
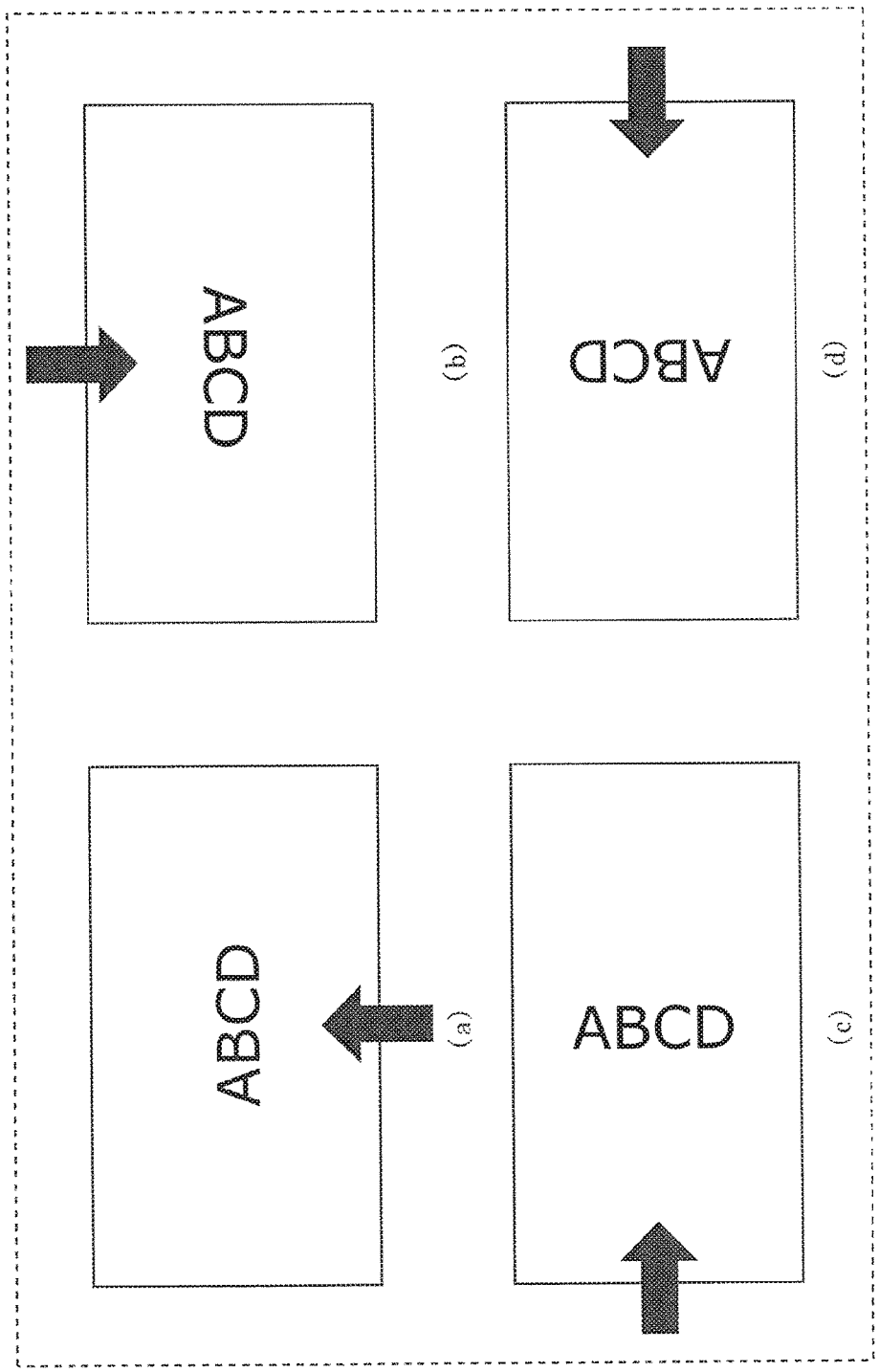
FIG. 4 illustrates another example of a rotational rendering process according an embodiment.

FIG. 4 illustrates another example of the rotational rendering process according an embodiment.

As illustrated in FIG. 4, renderer 103 performs the rotational rendering process so as to arrange an image right-side-up in front of a person who is heading in the entry direction (in the direction of an arrow in FIG. 4). For example, as illustrated in (a) of FIG. 4, renderer 103 does not perform the rotational rendering process for a person who is heading from bottom to top as viewed from a position facing the projection surface (for example, the ceiling). Alternatively, renderer 103 performs a rotational rendering process so as to rotate the image zero degrees. On the other hand, as illustrated in (b) of FIG. 4, renderer 103 performs a rotational rendering process so as to rotate the image 180 degrees for a person who is heading from top to bottom as viewed from a position facing the projection surface. Furthermore, as illustrated in (c) of FIG. 4, renderer 103 performs a rotational rendering process so as to rotate the image 90 degrees to the right for a person who is heading from left to right as viewed from a position facing the projection surface. Moreover, as illustrated in (d) of FIG. 4, renderer 103 performs a rotational rendering process so as to rotate the image 90 degrees to the left for a person who is heading from right to left as viewed from a position facing the projection surface.

Thus, image display control device 100 according to the present embodiment includes: entry detector 101 that detects, based on the image captured by imaging device 300, an entry position through which a person entered a range of imaging; entry direction identifying unit 102 that identifies, based on the entry position detected by entry detector 101 and a center position of a region including a range of projection, an entry direction in which the person entered the range of imaging; renderer 103 that performs on an image data item a rotational rendering process in which an image to be projected by projecting device 200 is rotated according to the entry direction identified by entry direction identifying unit 102; and output unit 104 that outputs to projecting device 200 the image data item on which the rotational rendering process has been performed by renderer 103.

With this, an image to be projected by projecting device 200 rotates according to the entry direction in which a person enters, and therefore it is possible to arrange the image right-side-up in front of the person, for example. Specifically, if, for example, a character is included in the image, the character can be properly oriented in relation to the person. As a result, regardless of which direction a person enters in, it is possible to display an image that is easy to view for the person.

In the present embodiment, entry direction identifying unit 102 identifies, as the entry direction, a center direction extending from the entry position toward the center position. Accordingly, any direction may be a possible entry direction without limitation, meaning that an image to be projected can be accurately arranged right-side-up in front of the person. As a result, a projected image can be easier to view.

[Setting of Directional Range]

Figure 5:
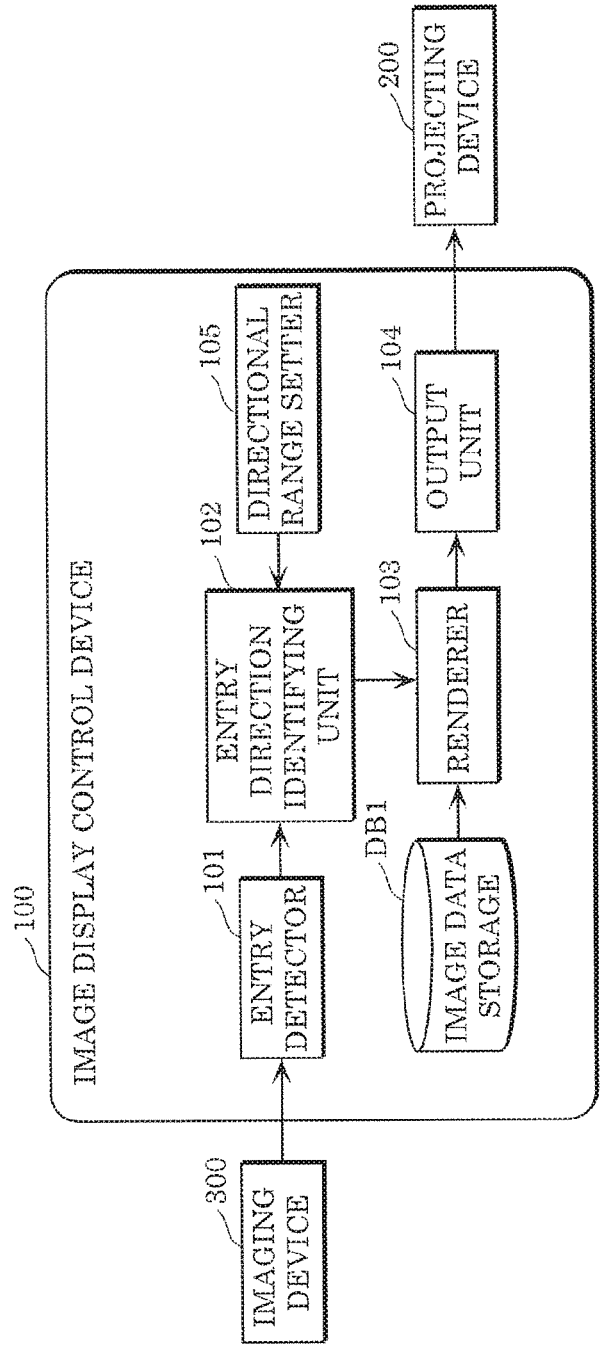
FIG. 5 is a block diagram illustrating another example of a configuration of an image display control device according to an embodiment.

FIG. 5 is a block diagram illustrating another example of a configuration of image display control device 100 according to an embodiment.

Image display control device 100 may further include directional range setter 105.

Directional range setter 105 receives and holds directional data, for example, according to user input. The directional data indicate a plurality of directional ranges on the projection surface which spread from the above-mentioned center position, and representative directions respectively associated with these directional ranges.

With reference to the directional data received by directional range setter 105, entry direction identifying unit 102 identifies, as the entry direction, a representative direction associated with the directional range that includes the center direction extending from the entry position toward the center position. This means that entry direction identifying unit 102 identifies a representative direction as the entry direction instead of, as described above, identifying a center direction as the entry direction.

Figure 6:
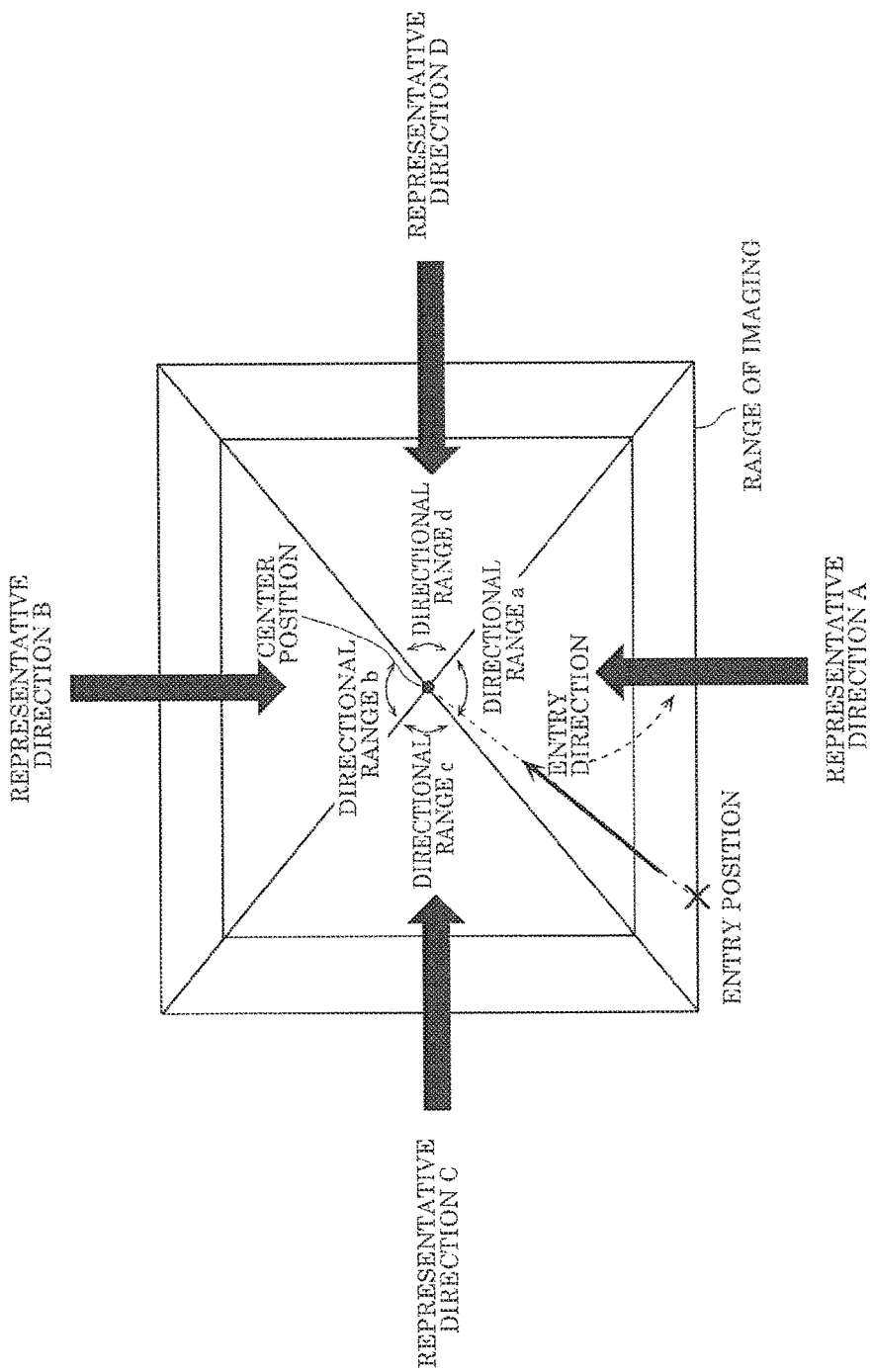
FIG. 6 illustrates an example of a directional range and a representative direction according to an embodiment.

FIG. 6 illustrates an example of the directional range and the representative direction according to an embodiment.

As illustrated in FIG. 6, directional range setter 105 holds directional data indicating four directional ranges a to d, and respective representative directions A to D associated with these directional ranges a to d, for example. The directional ranges a to d are, for example, ranges defined by two diagonal lines of a rectangular range of imaging.

Representative direction A is defined as being associated with directional range a and extending in the middle of such directional range a. Representative direction B is defined as being associated with directional range b and extending in the middle of such directional range b. Representative direction C is defined as being associated with directional range c and extending in the middle of such directional range c. Representative direction D is defined as being associated with directional range d and extending in the middle of such directional range d.

Directional range setter 105 receives directional ranges and representative directions such as those described above, for example, by way of user input, and generates directional data.

When the center direction extending from the entry position toward the center position is included in directional range a, entry direction identifying unit 102 identifies, as the entry direction, representative direction A associated with such directional range a, instead of the center direction.

As just described, image display control device 100 according to the present embodiment further includes directional range setter 105 which receives and holds directional data indicating a plurality of directional ranges on the projection surface which spread from the center position, and representative directions respectively associated with these directional ranges. With reference to the directional data received by directional range setter 105, entry direction identifying unit 102 then identifies, as the entry direction, a representative direction associated with the directional range that includes the center direction extending from the entry position toward the center position.

With this, one representative direction is identified as the entry direction for each of the directional ranges, and therefore it is possible to reduce the number of possible entry directions. As a result, the processing load of the rotational rendering process is reduced. For example, if there are four directional ranges, the number of possible entry directions is limited to four, meaning that in the rotational rendering process, it is sufficient that any one of 0, 90, 180, and 270 degrees, for example, is selected as an angle to rotate an image. Therefore, it is not necessary that an image be rotated at any angle, resulting in a reduction in the processing load.

[Setting of Image Data]

Figure 7:
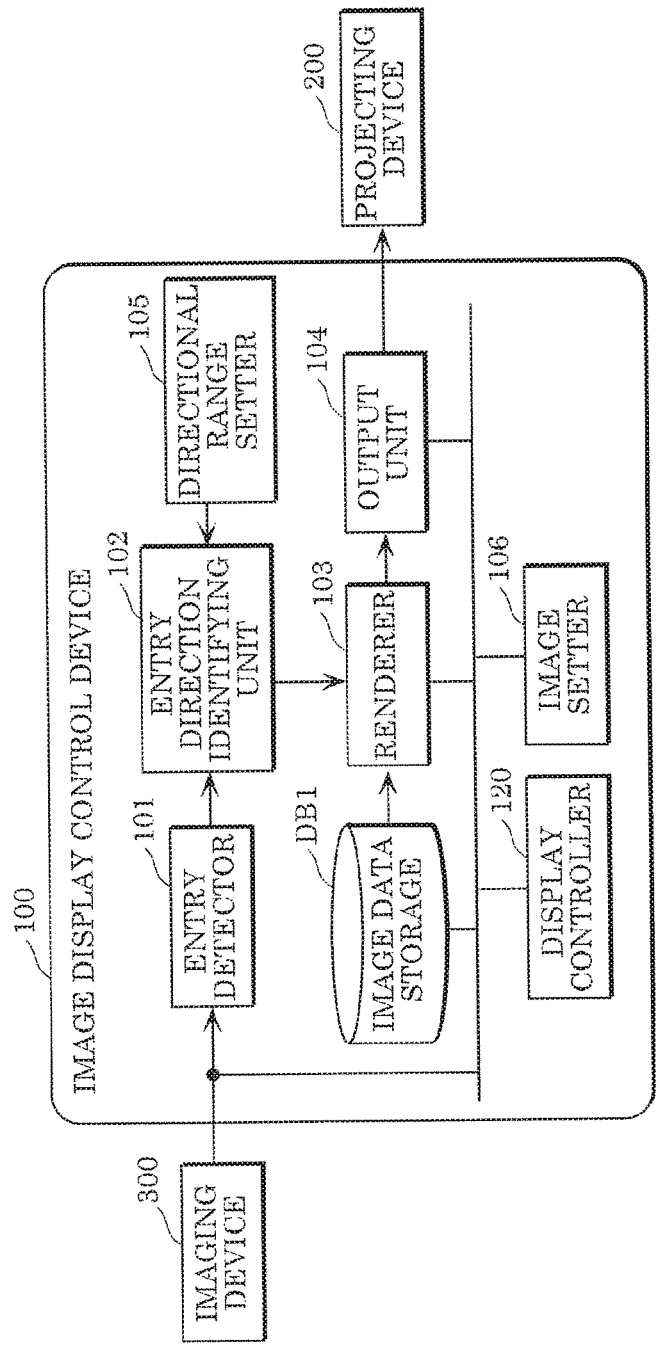
FIG. 7 is a block diagram illustrating another example of a configuration of an image display control device according to an embodiment.

FIG. 7 is a block diagram illustrating another example of a configuration of image display control device 100 according to an embodiment.

Image display control device 100 further includes image setter 106 and display controller 120.

Display controller 120 includes, for example, a liquid crystal display, an organic electroluminescence display, or the like display, and an input device (a controller) such as a keyboard, a mouse, or a touch pad, and serves as a user interface. Alternatively, display controller 120 may be in the form of a touch display.

On the basis of user input on display controller 120, image setter 106 selects, for each of the directional ranges, an image data item stored in image data storage DB1, and associates the image data item with the directional range. In detail, image setter 106 receives, for each of the directional ranges, identification information on an image data item stored on a recording medium, and associates the image data item with the directional range. For example, the identification information is a file name. Consequently, image setter 106 holds an image list including, for example, four directional ranges and respective file names of image data items associated with these directional ranges.

With reference to the above-stated image list, the renderer performs a rotational rendering process on an image data item stored in image data storage DB1 and indicated by the identification information associated with the directional range that includes the center direction. An image represented by such an image data item that is associated with each directional range and is subject to the rotational rendering process is hereinafter referred to as a switchable image.

Figure 8:
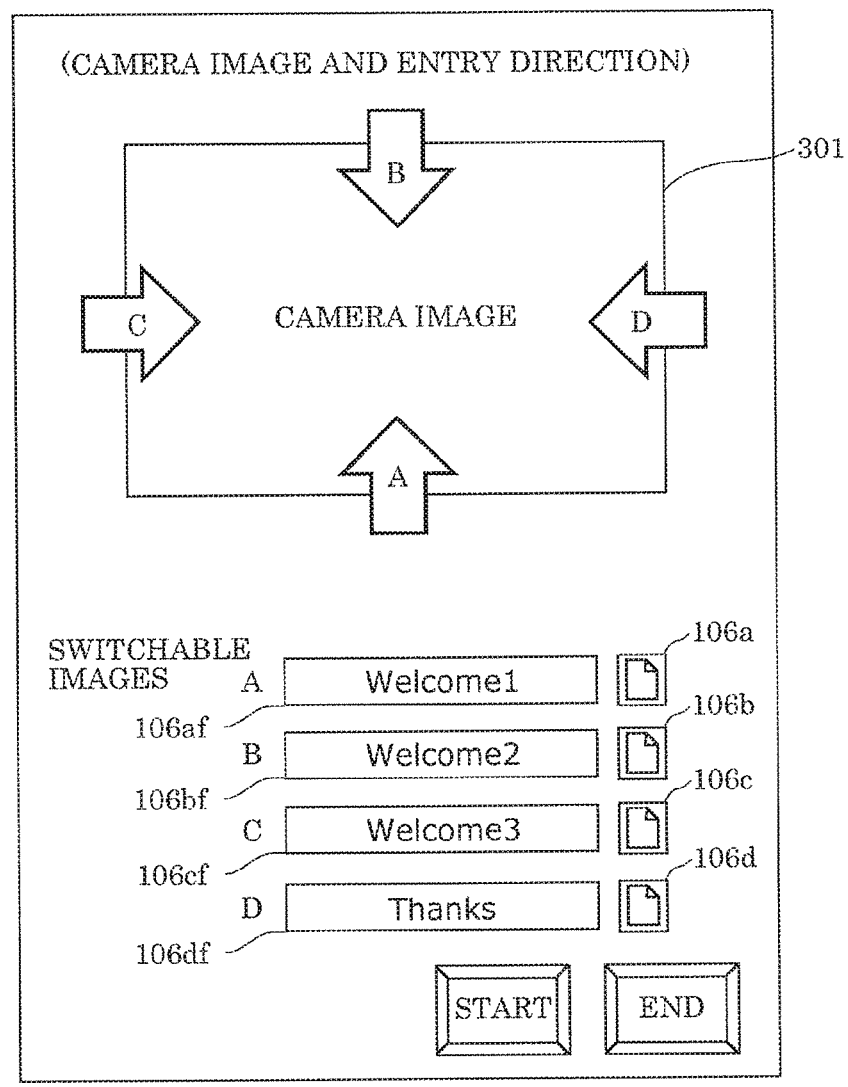
FIG. 8 illustrates an example of a settings screen displayed by a display controller according to an embodiment.

FIG. 8 illustrates an example of a settings screen displayed by display controller 120 according to an embodiment.

Display controller 120 displays, on the settings screen, camera image 301 transmitted from imaging device 300. Furthermore, under control of image setter 106, display controller 120 displays, on the settings screen, four file name fields 106af to 106df, and respective icons 106a to 106d associated with these file name fields. These file name fields and icons are associated with respective directional ranges. Note that four directional ranges a to d stated above correspond to respective representative directions A to D and that representative directions A to D are identified as the entry direction. Thus, the above file name fields and icons are associated with respective entry directions A to D.

Icons 106a to 106d are associated with respective directional ranges, that is, entry directions, and are manipulated by a user to associate respective image data items with the entry directions. File name fields 106af to 106df show respective image data items selected as a result of manipulation of the icons associated with these file name fields, that is, respective file names of switchable images.

For example, when icon 106a associated with directional range a, that is, entry direction A, is selected, image setter 106 causes display controller 120 to display file names of a plurality of image data items stored in image data storage DB1. Subsequently, when any one of the displayed file names of the plurality of image data items is selected, image setter 106 causes display controller 120 to display the selected filed name (for example, "Welcome1") in file name field 106af. In this way, directional range a (entry direction A) and the file name of an image data item "Welcome1" are associated with each other. Also when icons 106b to 106d are selected, the directional ranges (the entry directions) and the file names of image data items are associated with each other in the same or similar manner as described above. As a result, the above-described image list is generated which indicates association between these directional ranges (the entry directions) and the image data items (specifically, the file names of the image data items).

Figure 9A:
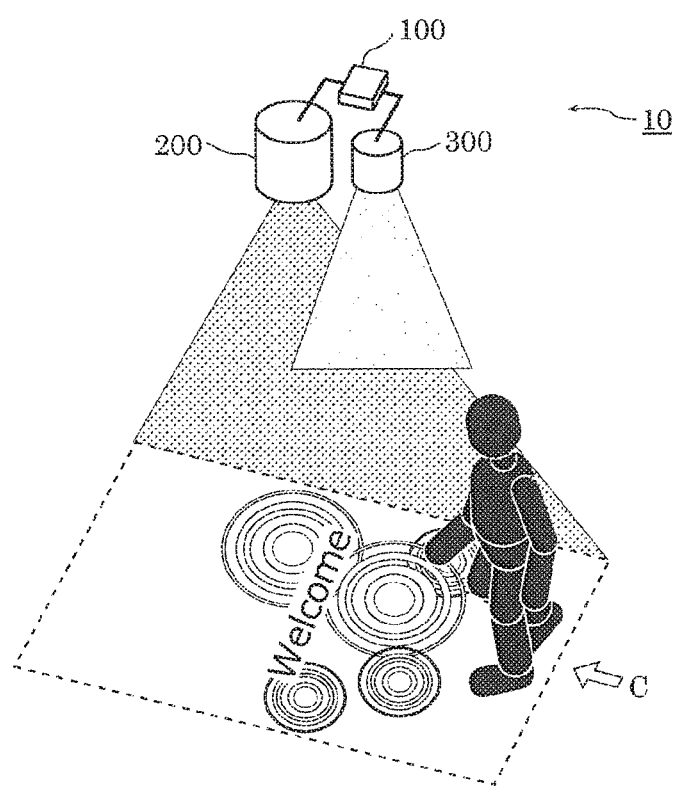
FIG. 9A illustrates an example of an image displayed for entry direction C according to an embodiment.
Figure 9B:
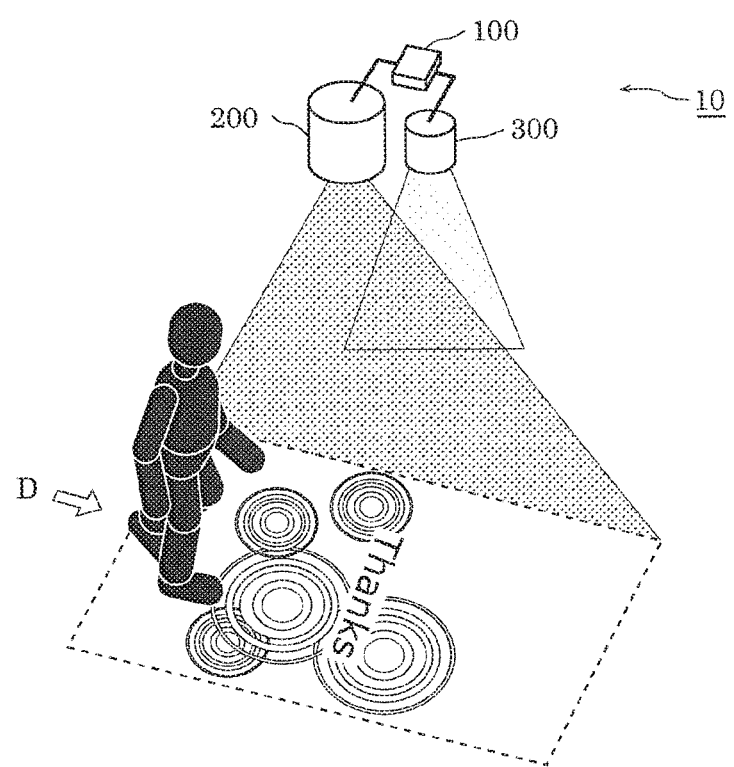
FIG. 9B illustrates an example of an image displayed for entry direction D according to an embodiment.

FIG. 9A and FIG. 9B illustrate an example of images displayed for entry directions C and D according to an embodiment.

For example, as illustrated in FIG. 9A, when a user enters the range of imaging in entry direction C, image display control device 100 performs a rotational rendering process on an image data item identified by, for example, a file name "Welcome3" associated with entry direction C. Image display control device 100 then outputs, to projecting device 200, the image data item on which the rotational rendering process has been performed. Consequently, a switchable image is projected showing characters "Welcome" properly oriented in relation to a person entering a shop, for example.

In the meantime, as illustrated in FIG. 9B, when a user enters the range of imaging in entry direction D, image display control device 100 performs a rotational rendering process on an image data item identified by, for example, a file name "Thanks" associated with entry direction D. Image display control device 100 then outputs, to projecting device 200, the image data item on which the rotational rendering process has been performed. Consequently, a switchable image is projected showing characters "Thanks" properly oriented in relation to a person exiting a shop, for example.

As just described, image display control device 100 according to the present embodiment further includes image setter 106 which receives, for each of the directional ranges, identification information of an image data item stored on a recording medium, and associates the identification information with the directional range. Renderer 103 performs the above-described rotational rendering process on the image data item indicated by the identification information associated with the directional range that includes the center direction.

This allows projecting device 200 to project a different image for each of the directional ranges, that is, for each entry direction. For example, for a person entering in one entry direction, an image showing "Welcome" can be displayed in such a way that it is easy to view, while, for a person entering in the opposite entry direction, an image showing "Thanks" can be displayed in such a way that it is easy to view.

[Instruction to Perform Rotating Process]

Figure 10:
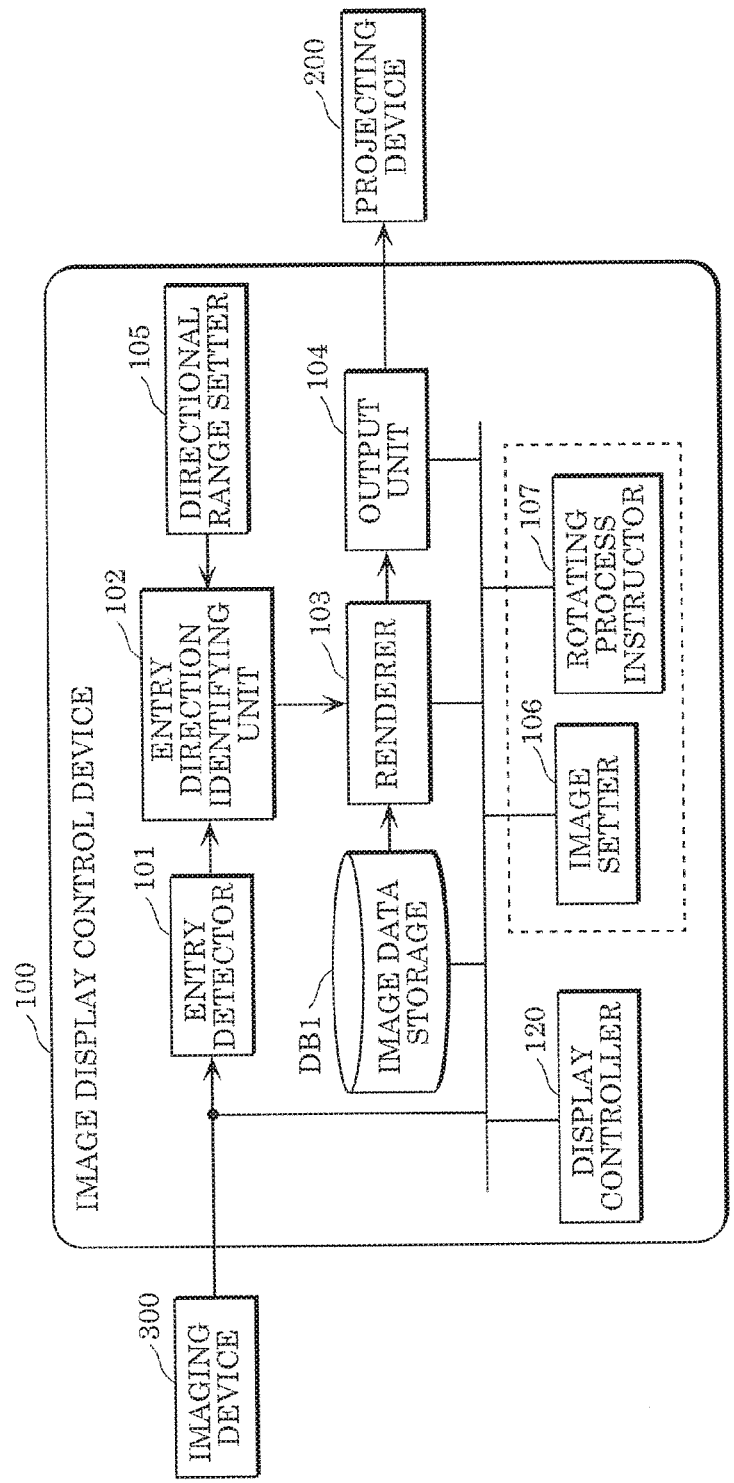
FIG. 10 is a block diagram illustrating another example of a configuration of an image display control device according to an embodiment.

FIG. 10 is a block diagram illustrating another example of a configuration of image display control device 100 according to an embodiment.

Image display control device 100 may further include rotating process instructor 107.

On the basis of user input on display controller 120, rotating process instructor 107 receives, for each of the directional ranges, a rotational rendering instruction to perform a rotational rendering process.

Renderer 103 determines whether or not the rotational rendering instruction has been received for the directional range that includes the center direction. When renderer 103 determines that the rotational rendering instruction has been received, renderer 103 performs the rotational rendering process on the image data item having the file name associated with the directional range.

Figure 11:
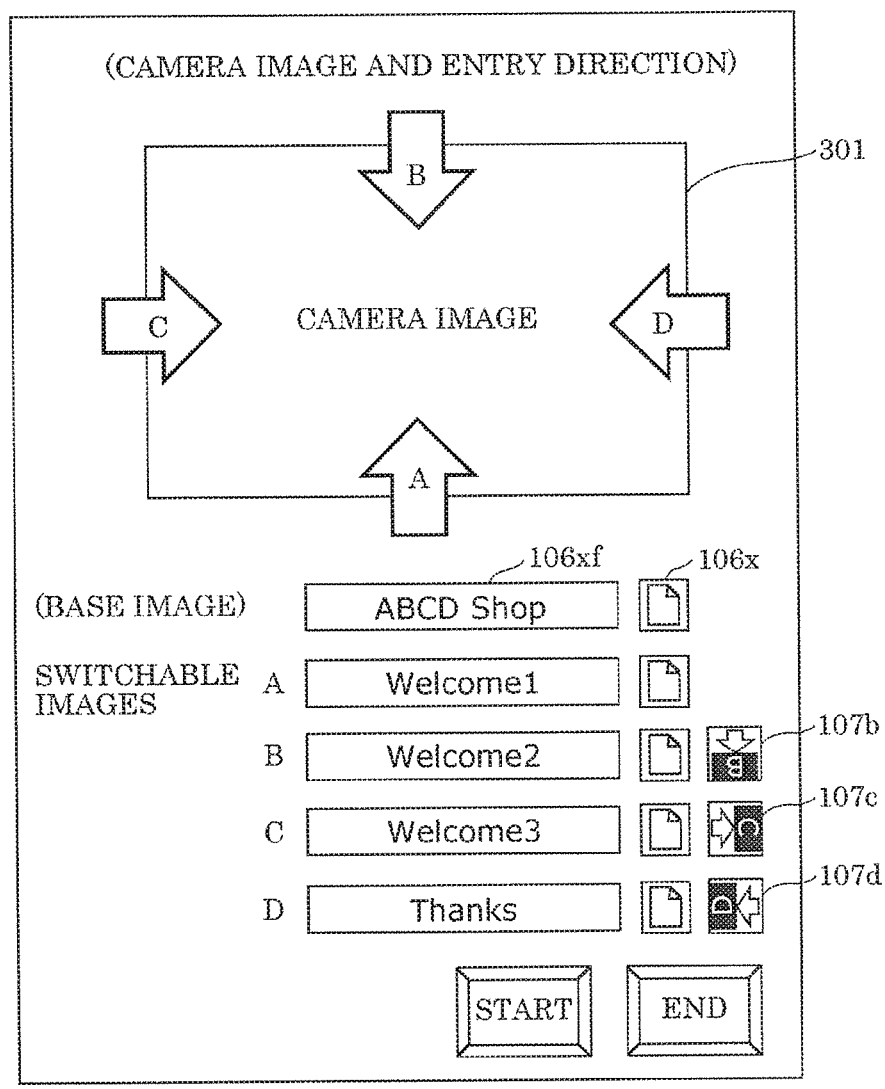
FIG. 11 illustrates another example of a settings screen displayed by a display controller according to an embodiment.

FIG. 11 illustrates another example of the settings screen displayed by display controller 120 according to an embodiment.

Under control of rotating process instructor 107, display controller 120 further displays, on the settings screen, icons 107*b* to 107*d* for receiving a rotational rendering instruction, in association with respective directional ranges b to d (entry directions B to D).

For example, when icon 107*b* is selected, rotating process instructor 107 receives the rotational rendering instruction for directional range b (entry direction B) associated with icon 107*b*. As a result, rotating process instructor 107 causes display controller 120 to change the color of icon 107*b*, for example, from white to red. This notifies a user that the rotational rendering process is performed for entry direction B. When icon 107*c* is selected and when 107*d* is selected, the same or similar processing is performed as that performed when icon 107*b* is selected.

Note that an icon such as icons 107*b* to 107*d* is not displayed for directional range a. This is because, for entry direction A, an angle for rotating a switchable image in a rotational rendering process is zero degrees, meaning that there is no need to receive a rotational rendering instruction.

Under control of image setter 106, display controller 120 may further display, on the settings screen, file name field 106*xf* and icon 106*x* associated with a base image. A user manipulates icon 106*x* to select an image data item of the base image. A file name of the image data item of the base image selected as a result of manipulation of icon 106*x* is displayed in file name field 106*xf*. The base image is an image to be projected by projecting device 200 when no entry of a person is detected.

For example, when icon 106*x* is selected, image setter 106 causes display controller 120 to display file names of a plurality of image data items stored in image data storage DB1. Subsequently, when any one of the displayed file names of the plurality of image data items is selected, image setter 106 causes display controller 120 to display the selected filed name (for example, "ABCD Shop") in file name field 106*xf*. Accordingly, image setter 106 includes the file name of the base image in the above-described image list.

Accordingly, when no entry of a person (no entry position) is detected, renderer 103 identifies an image data item of the base image with reference to the image list. Renderer 103 then causes output unit 104 to output the image data item to projecting device 200. As a result, when no one has entered the range of imaging, projecting device 200 projects the base image.

Figure 12:
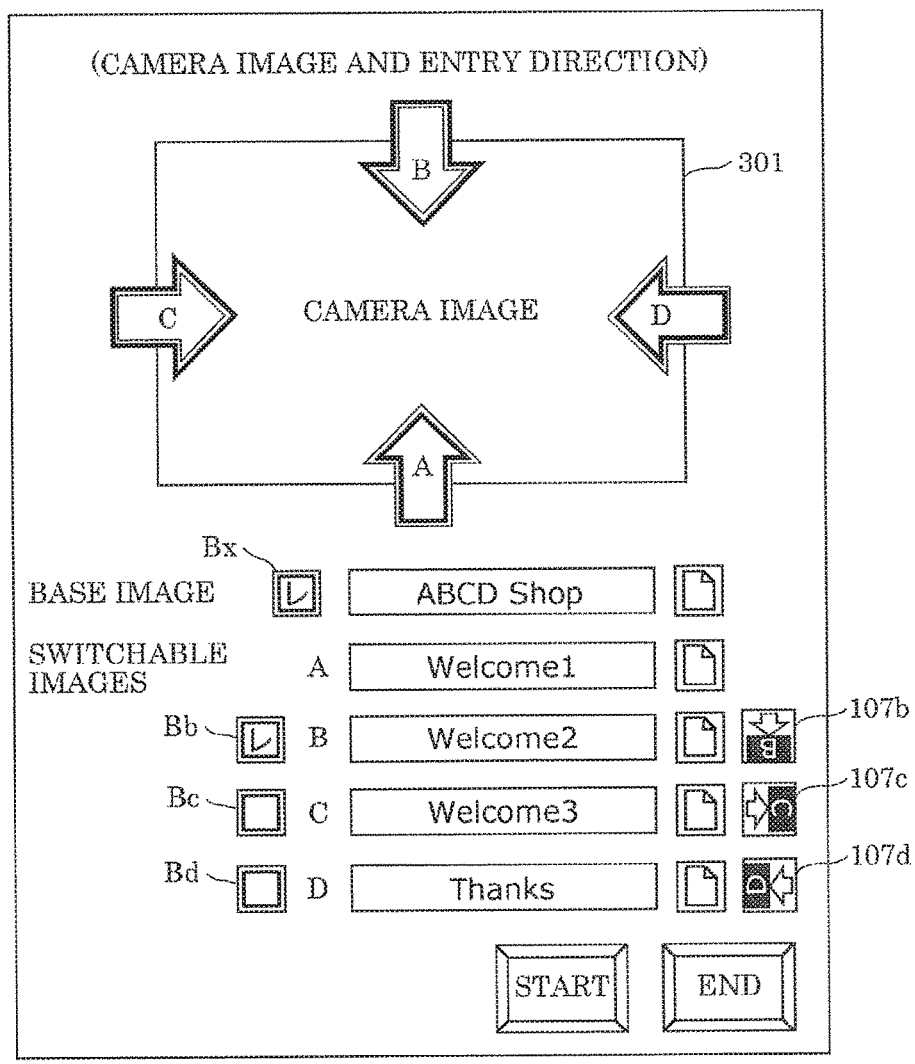
FIG. 12 illustrates another example of a settings screen displayed by a display controller according to an embodiment.

FIG. 12 illustrates another example of the settings screen displayed by display controller 120 according to an embodiment.

Under control of rotating process instructor 107, display controller 120 may further display, on the settings screen, check boxes Bb to Bd for receiving the rotational rendering instruction, in association with respective directional ranges b to c (entry directions B to D). For example, when a check mark is placed in check box Bb, rotating process instructor 107 receives a rotational rendering instruction for directional range b (entry direction B) associated with check box Bb.

In this case, icons 107*b* to 107*d* are not selected, and the colors of these icons notify a user whether or not the rotational rendering instruction has been received. Alternatively, under control of rotating process instructor 107, a check mark may be automatically placed in a check box associated with one of icons 107*b* to 107*d* when the icon is selected.

Under control of image setter 106, display controller 120 may further display, on the settings screen, check box Bx for receiving an instruction to use the base image (hereinafter referred to as a base use instruction). For example, when a check mark is placed in check box Bx, image setter 106 records the base use instruction onto the image list in association with the file name (for example, "ABCD shop") of the base image included in the image list. On the other hand, when no check mark is placed in check box Bx, image setter 106 does not associate the base use instruction with the file name (for example, "ABCD shop") of the base image included in the image list.

Accordingly, with reference to the image list, renderer 103 determines whether or not the base use instruction has been received. When renderer 103 determines that the base use instruction has been received, renderer 103 reads the image data item of the base image from image data storage DB1 and outputs the read image data item to output unit 104.

As just described, image display control device 100 according to the present embodiment further includes rotating process instructor 107 which receives, for each of the directional ranges, a rotational rendering instruction to perform a rotational rendering process. Renderer 103 determines whether or not the rotational rendering instruction has been received for the directional range that includes the center direction. When renderer 103 determines that the rotational rendering instruction has been received, renderer 103 performs the rotational rendering process on the image data item.

This makes it possible to rotate or not to rotate an image for each of the directional ranges, that is, for each entry direction. Thus, an image for an entry direction which does not require rotation can be kept from rotating, and therefore it is possible to reduce the processing load of the rotational rendering process.

[Priority]

Figure 13:
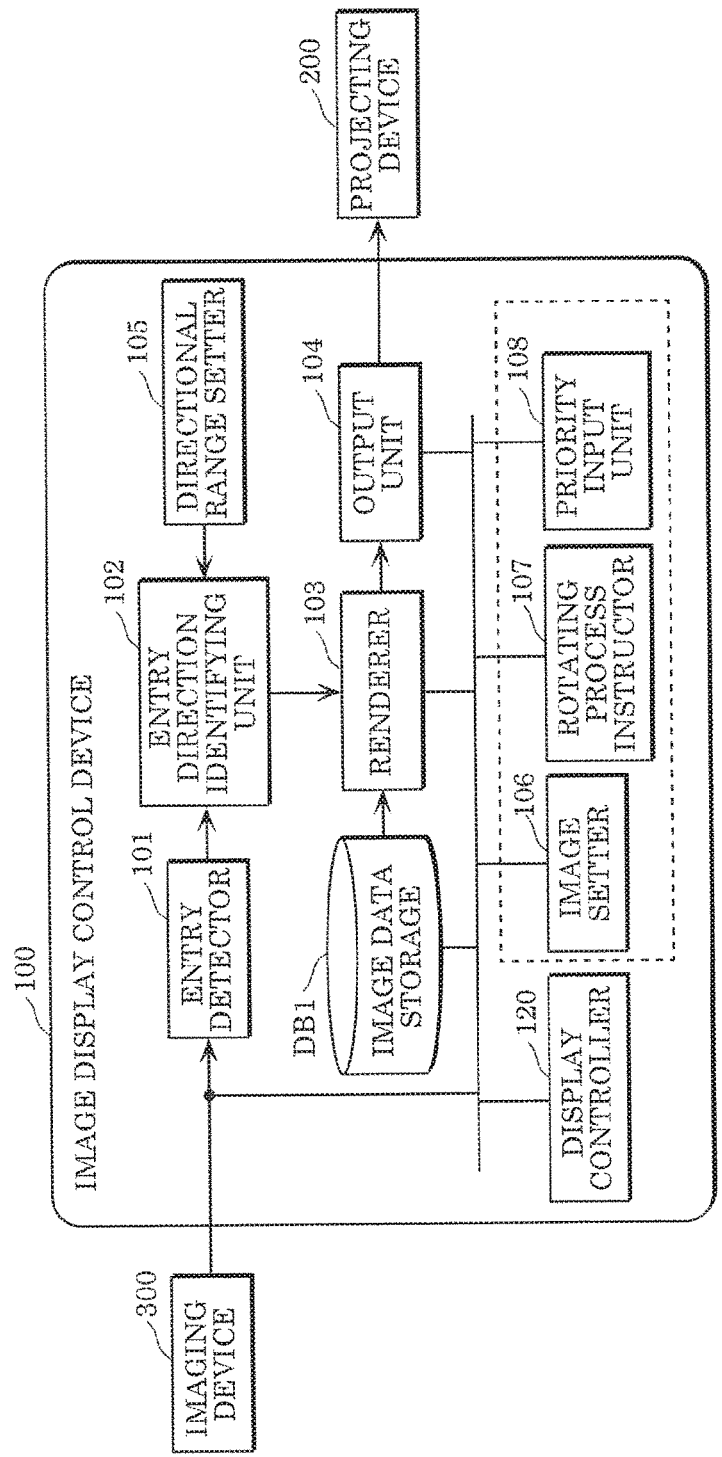
FIG. 13 is a block diagram illustrating another example of a configuration of an image display control device according to an embodiment.

FIG. 13 is a block diagram illustrating another example of a configuration of image display control device 100 according to an embodiment.

Image display control device 100 may further include priority input unit 108.

Priority input unit 108 receives a priority of each of the directional ranges.

When entry direction identifying unit 102 identifies a plurality of entry directions during a predetermined period, renderer 103 performs the rotational rendering process based on an entry direction included in a directional range with the highest priority among directional ranges respectively associated with the plurality of entry directions.

For example, when entry directions A to D are identified at the same time, renderer 103 performs a rotational rendering process based on the entry direction included in the directional range with the highest priority among the directional ranges a to d. Assume, for example, entry direction A is identified and then another entry direction, entry direction B, is identified within the above period. Directional range a associated with entry direction A has a higher priority than directional range b associated with entry direction B. In this case, even when a rotational rendering process based on entry direction A is started and then another entry direction, entry direction B, is identified, renderer 103 does not perform a rotational rendering process based on entry direction B, but continues the rotational rendering process based on entry direction A. In the case where another entry direction, entry direction B, is identified, renderer 103 may start the rotational rendering process based on entry direction B when the rotational rendering process based on entry direction A is ended. Alternatively, renderer 103 may start the rotational rendering process based on entry direction B after a lapse of a predetermined period following the start of the rotational rendering process based on entry direction A.

Figure 14:
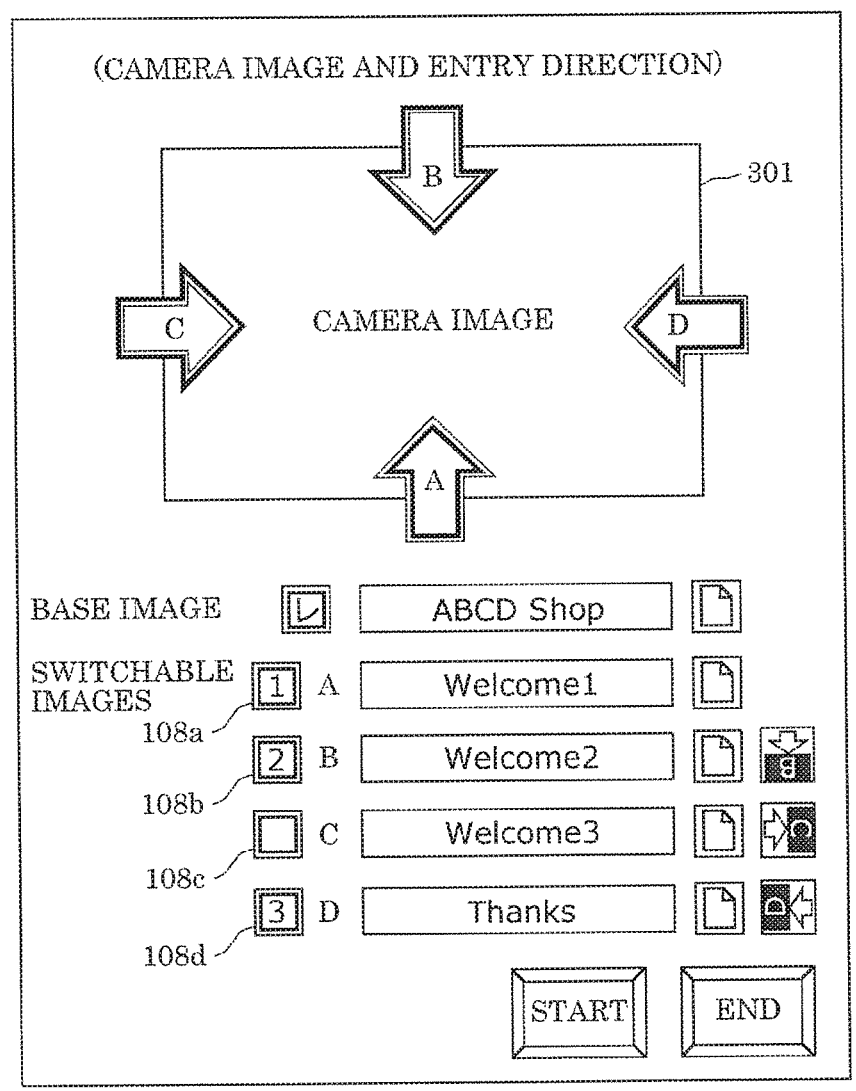
FIG. 14 illustrates another example of a settings screen displayed by a display controller according to an embodiment.

FIG. 14 illustrates another example of the settings screen displayed by display controller 120 according to an embodiment.

Under control of priority input unit 108, display controller 120 displays, on the setting screen, boxes 108a to 107d for entering a priority, in association with respective directional ranges a to d (entry directions A to D). A numerical value indicating a priority is entered in each of boxes 108a to 107d. For example, a smaller numerical value indicates a higher priority. Priority input unit 108 receives, as priorities, numerical values entered in boxes 108a to 107d. For example, "1" is entered in box 108a, "2" in box 108b, and "3" in box 108d. In this case, priority input unit 108 receives the highest priority for directional range a associated with box 108a, the second highest priority for directional range b associated with box 108b, the third highest priority for directional range d associated with box 108d, and the lowest priority for directional range c associated with box 108c.

As just described, image display control device 100 according to the present embodiment further includes priority input unit 108 which receives a priority of each of the directional ranges. When entry direction identifying unit 102 identifies a plurality of entry directions during a predetermined period, renderer 103 performs a rotational rendering process based on the entry direction included in the directional range with the highest priority among the respective directional ranges associated with the plurality of identified entry directions.

With this, it is possible to prevent cancellation or interruption of a rotational rendering process based on an entry direction included in a directional range with a high priority, which is due to a rotational entering process based on an entry direction included in a directional range with a low priority. Therefore, it is possible to project an image after properly rotating the image for an important entry direction. Furthermore, since such a priority is received, it is possible to appropriately determine a priority according to the purpose or application of an image display control device and a system including the image display control device.

Note that when no priority is received for any of the directional ranges, every time entry direction identifying unit 102 identifies an entry direction, renderer 103 may stop performing a rotational rendering process under way and perform a rotational rendering process based on the identified entry direction. Furthermore, in the above-described case, when entry direction identifying unit 102 identifies a plurality of entry directions at the same time, renderer 103 does not need to perform a rotational rendering process for any of the entry directions.

[Image Repeat]

Figure 15:
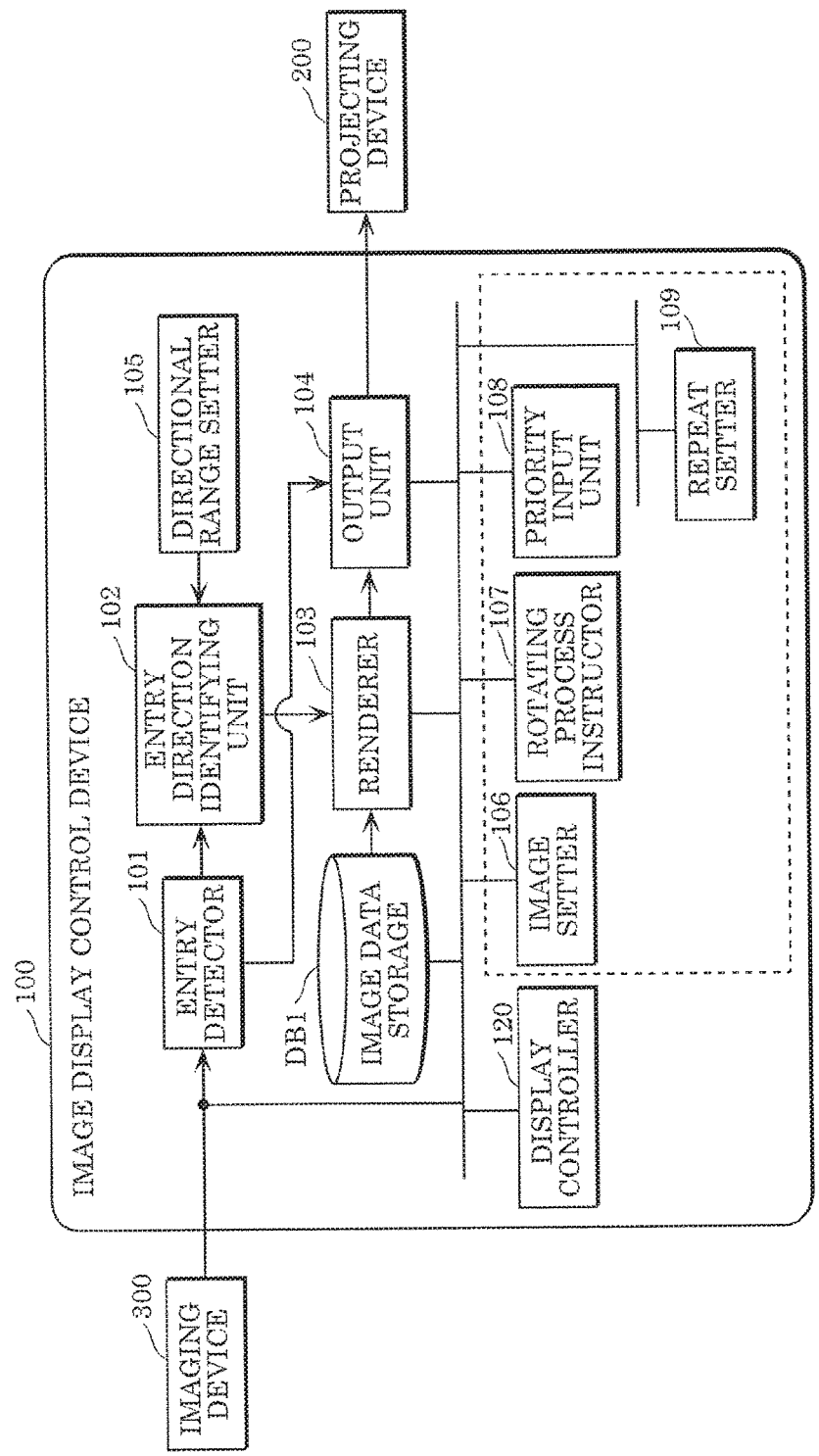
FIG. 15 is a block diagram illustrating another example of a configuration of an image display control device according to an embodiment.

FIG. 15 is a block diagram illustrating another example of a configuration of image display control device 100 according to an embodiment.

Image display control device 100 may further include repeat setter 109.

In the case where the switchable image to be projected is moving images, repeat setter 109 receives an instruction to, after an end of displaying the moving images, repeatedly display the moving images (a repeat instruction).

When the repeat instruction is received, entry detector 101 determines whether or not a person who entered a range of imaging has exited the range of imaging.

When entry detector 101 determines that the person has not exited at the time the output of image data items is ended, output unit 104 resumes outputting the image data items to projecting device 200. In this way, the moving images that are an already displayed switchable image are displayed again from the beginning.

Figure 16:
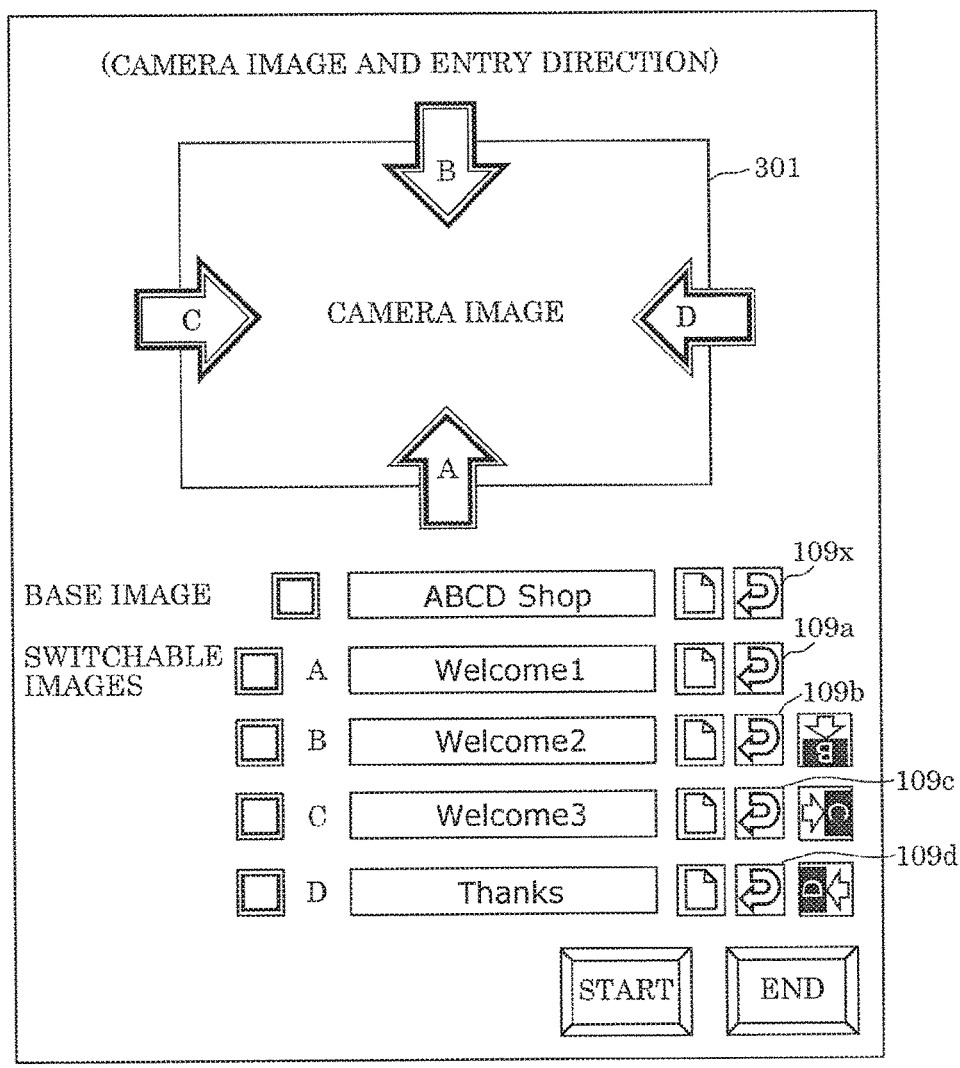
FIG. 16 illustrates another example of a settings screen displayed by a display controller according to an embodiment.

FIG. 16 illustrates another example of the settings screen displayed by display controller 120 according to an embodiment.

Under control of repeat setter 109, display controller 120 displays, on the settings screen, icons 109a to 109d for receiving a repeat instruction, in association with respective directional ranges a to d (entry directions A to D). When any of icons 109a to 109d is selected, repeat setter 109 causes display controller 120 to change the color of the selected icon, for example, from white to red. This notifies a user that an image is repeatedly displayed for the entry direction associated with the selected icon in red.

Repeat setter 109 may receive the repeat instruction for the base image. In this case, under control of repeat setter 109, display controller 120 displays, on the settings screen, icon 109x for receiving a repeat instruction for the base image, in association with the base image. When icon 109x is selected, repeat setter 109 causes display controller 120 to change the color of selected icon 109x, for example, from white to red. This notifies a user that the base image is repeatedly displayed. When the repeat instruction for the base image is received, output unit 104 repetitively outputs the image data item representing the base image to projecting device 200 unless a person enters the range of imaging. In this way, the base image that is moving images is repetitively displayed.

As just described, entry detector 101 according to the present embodiment further determines whether or not a person who entered a range of imaging has exited the range of imaging. When entry detector 101 determines that the person has not exited at the time the output of an image data item is ended, output unit 104 resumes outputting the image data item to projecting device 200.

This results in that while a person who entered a range of imaging is staying in the range of imaging, images are repeatedly displayed without interruption and therefore can continue to draw the interest of the person.

[Fade Setting]

Figure 17:
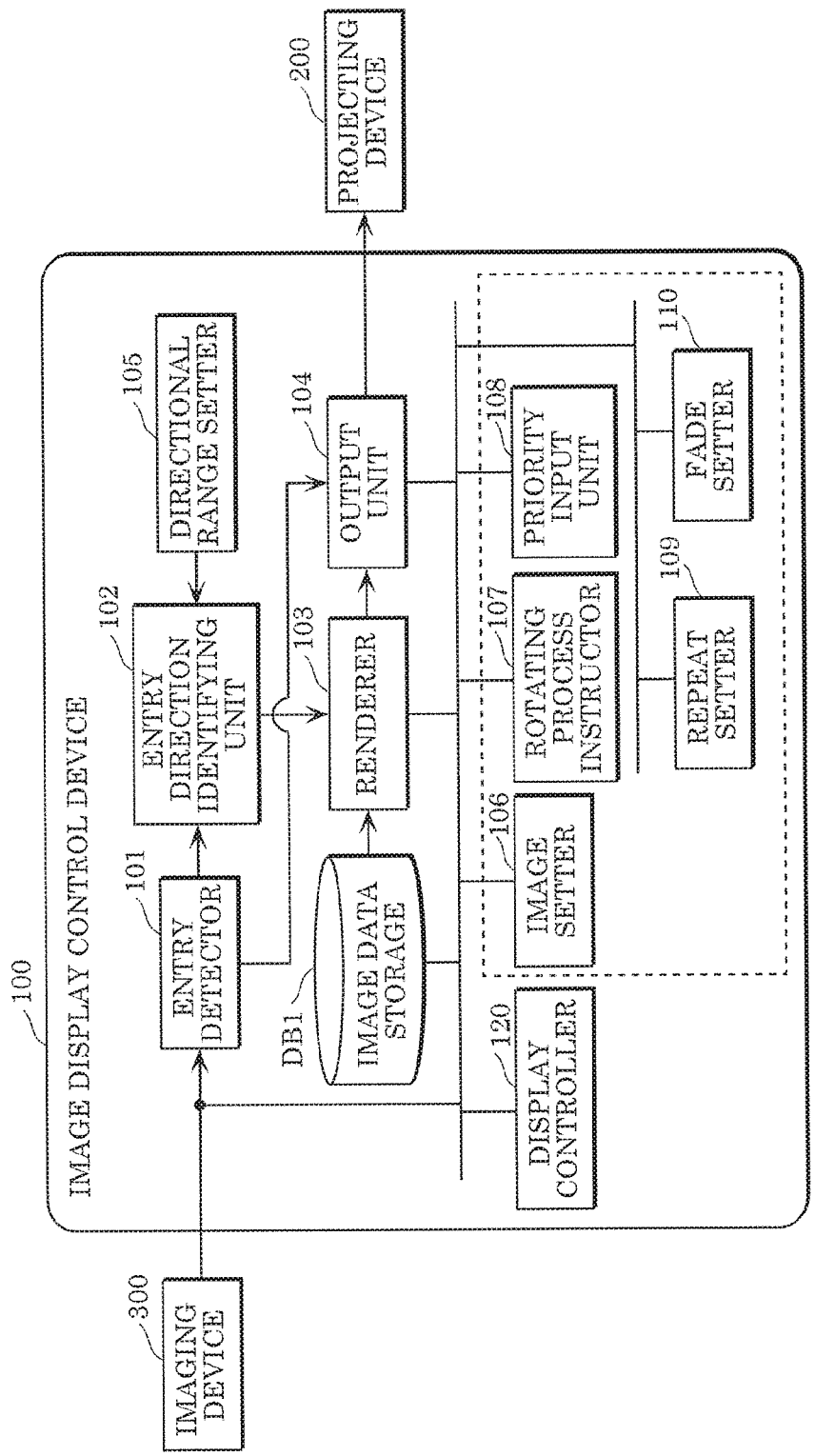
FIG. 17 is a block diagram illustrating another example of a configuration of an image display control device according to an embodiment.

FIG. 17 is a block diagram illustrating another example of a configuration of image display control device 100 according to an embodiment.

Image display control device 100 may further include fade setter 110.

When one image is successively switched to another, fade setter 110 receives an instruction to fade these images (a fade instruction). In the case of fading, one image fades out and the other image fades in. Furthermore, fade setter 110 receives the type of fading, that is, cross-fade or non-cross-fade. Cross-fade is fading that includes a period of overlap between an image represented by an image data item and an image represented by a new image data item. Non-cross-fade is fading that does not include the period of overlap.

In the case where the fade instruction is received, when entry detector 101 detects a new entry position while output unit 104 is outputting an image data item, output unit 104 switches the image data item to a new image data item and outputs the new image data item in such a way that images represented by these image data items fade. More specifically, output unit 104 switches an image data item which output unit 104 is currently outputting to a new image data item on which a rotational rendering process has been performed according to the detected new entry position, and outputs the new image data item in such a way that an image represented by the image data item fades out and an image represented by the new image data item fades in.

Furthermore, output unit 104 switches an image data item to a new image data item and outputs the new image data item in accordance with the type of fading received by fade setter 110. For example, when cross-fade is received as the type of fading, output unit 104 switches an image data item to a new image data item and outputs the new image data item in such a way that cross-fade occurs. On the other hand, when non-cross-fade is received as the type of fading, output unit 104 switches an image data item to a new image data item and outputs the new image data item in such a way that cross-fade does not occur. More specifically, output unit 104 switches an image data item to a new image data item and outputs the new image data item in such a way that after a lapse of a blackout period following fade-out of an image, a new image fades in.

Figure 18:
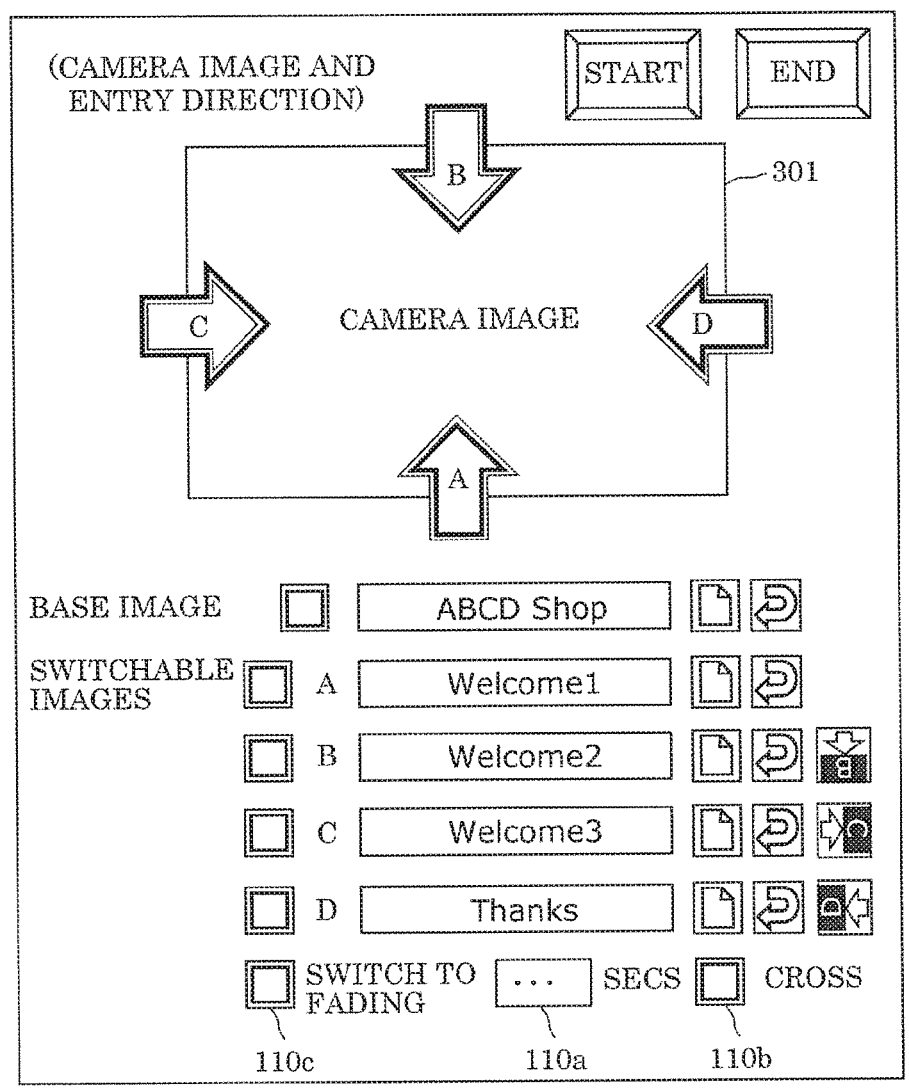
FIG. 18 illustrates another example of a settings screen displayed by a display controller according to an embodiment.

FIG. 18 illustrates another example of the settings screen displayed by display controller 120 according to an embodiment.

Under control of fade setter 110, display controller 120 displays, on the settings screen, check box 110c for receiving a fade instruction. Furthermore, display controller 120 displays, on the settings screen, box 110a for entering the time required for fading and check box 110b for receiving cross-fade as the type of fading.

When a check mark is placed in check box 110c, fade setter 110 receives a fade instruction. Furthermore, when time is entered in box 110a, fade setter 110 receives the time. When the time is received, output unit 104 switches image data items that are to be output, in a manner that it takes the received time (seconds) for images to fade out and fade in. Moreover, when a check mark is placed in check box 110b, fade setter 110 receives cross-fade as the type of fading. Without a check mark placed in check box 110b, fade setter 110 receives non-cross-fade as the type of fading.

In this way, when entry detector 101 detects a new entry position while output unit 104 according to the present embodiment is outputting an image data item, output unit 104 switches the image data item which output unit 104 is currently outputting to a new image data item on which a rotational rendering process has been performed according to the detected new entry position, and outputs the new image data item in such a way that an image represented by the image data item fades out and an image represented by the new image data item fades in.

With this, images to be projected can be switched without causing a feeling of discomfort for a person who enters the range of imaging.

Image display control device 100 according to the present embodiment further includes fade setter 110 which receives, according to user input, one of the following types of fading: cross-fade having a period of overlap between an image represented by an image data item and an image represented by a new image data item; and non-cross-fade not having the period of overlap. Output unit 104 switches an image data item to a new image data item and outputs the new image data item in accordance with the type of fading received by fade setter 110.

With this, the type of fading can be changed, and therefore it is possible to effect fading according to the purpose or application of image display control device 100 and image display system 10 including image display control device 100.

[Exit Setting]

Figure 19:
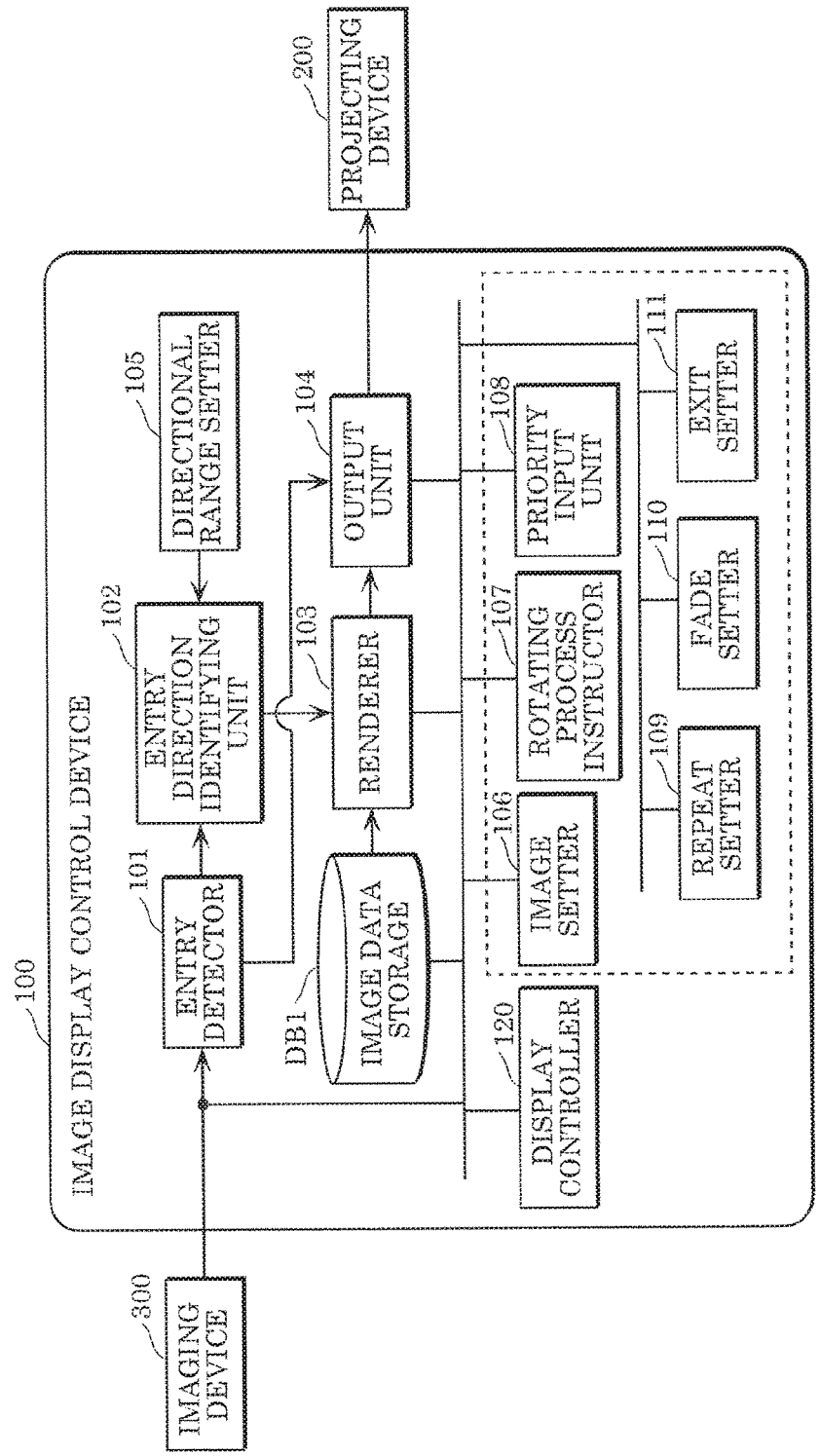
FIG. 19 is a block diagram illustrating another example of a configuration of an image display control device according to an embodiment.

FIG. 19 is a block diagram illustrating another example of a configuration of image display control device 100 according to an embodiment.

Image display control device 100 may further include exit setter 111.

When a person who entered a range of imaging exits the range of imaging, exit setter 111 receives an instruction to stop output of an image data item of a switchable image to projecting device 200 (a stop instruction).

When the stop instruction is received, entry detector 101 determines whether or not a person who entered a range of imaging has exited the range of imaging. When entry detector 101 determines that the person has exited the range of imaging while output unit 104 is outputting an image data item of a switchable image to projecting device 200, output unit 104 stops outputting the image data item of the switchable image to projecting device 200.

Figure 20:
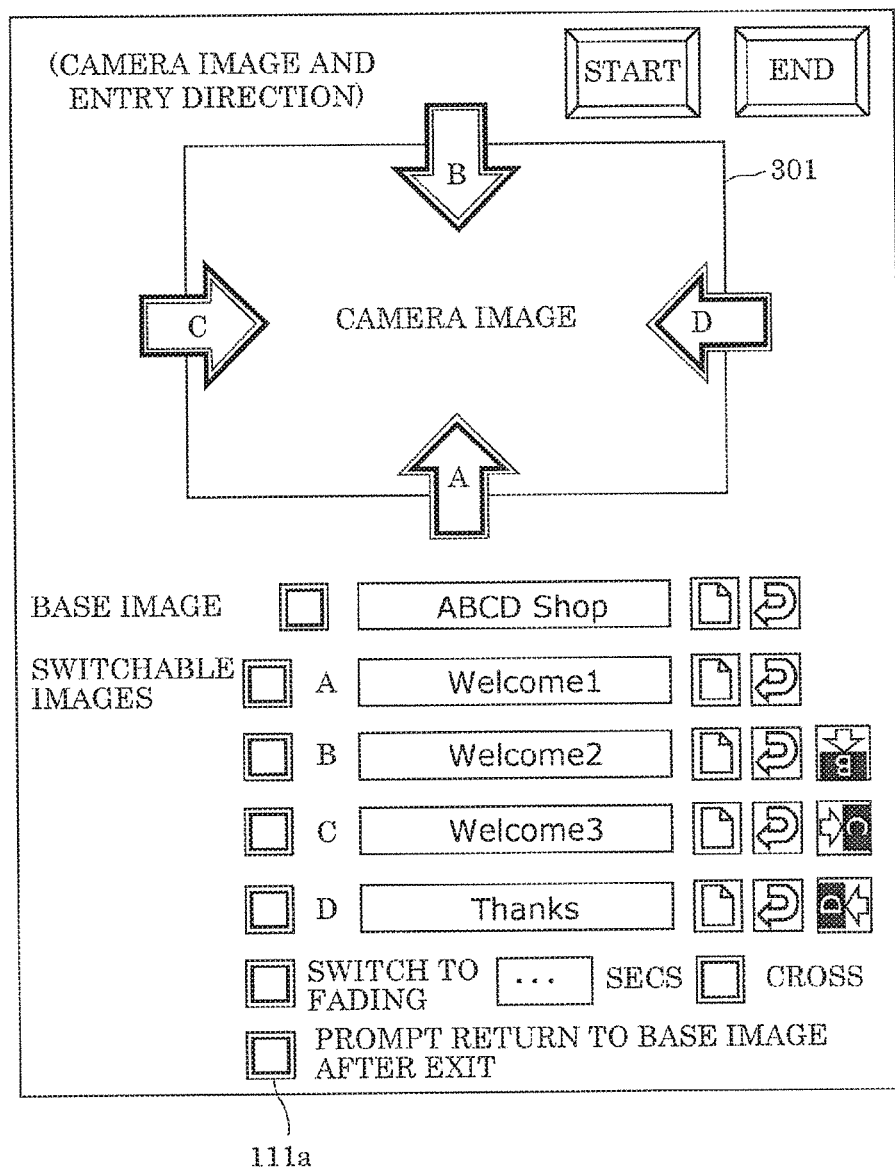
FIG. 20 illustrates another example of a settings screen displayed by a display controller according to an embodiment.

FIG. 20 illustrates another example of the settings screen displayed by display controller 120 according to an embodiment.

Under control of exit setter 111, display controller 120 displays, on the settings screen, check box 111a for receiving a stop instruction.

When a check mark is placed in check box 111a, exit setter 111 receives a stop instruction. When the stop instruction is received, entry detector 101 determines whether or not a person who entered a range of imaging has exited the range of imaging. When entry detector 101 detects an exit while output unit 104 is outputting an image data item of a switchable image to projecting device 200, output unit 104 stops outputting the image data item of the switchable image to projecting device 200. Output unit 104 then obtains an image data item of the base image from renderer 103 and outputs the image data item of the base image to projecting device 200. In this way, when the person exits, the image to be projected is switched from the switchable image to the base image.

As just described, entry detector 101 according to the present embodiment further determines whether or not a person who entered a range of imaging has exited the range of imaging. When entry detector 101 determines that the person has exited while output unit 104 is outputting an image data item to projecting device 200, output unit 104 stops outputting the image data item to projecting device 200. This means that output of the image data item of the switchable image is suspended.

This makes it possible to prevent the image data item of the switchable image from being wastefully output even after the person exited. As a result, power is saved or the processing load is reduced.

Figure 21:
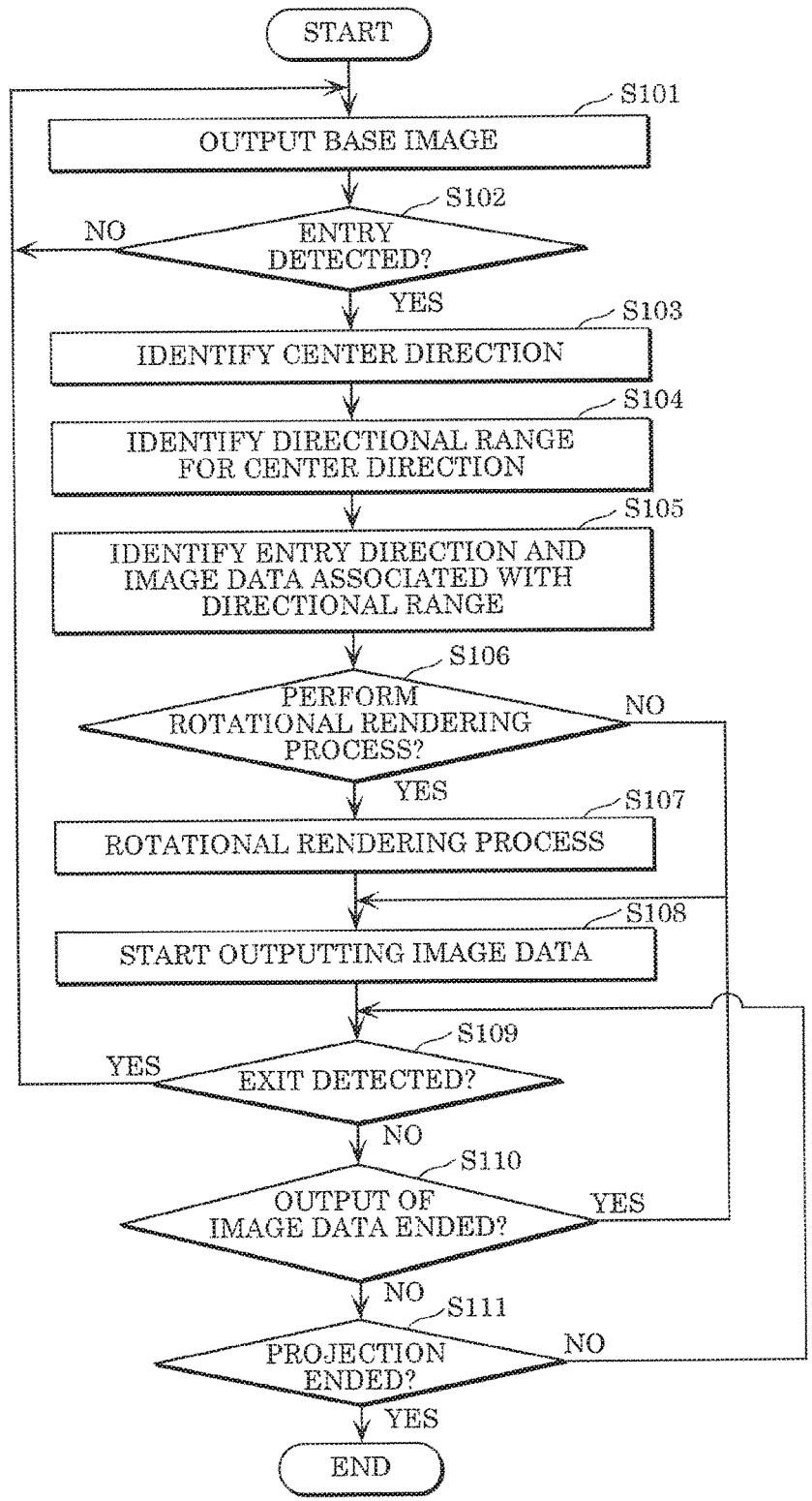
FIG. 21 is a flow chart illustrating an example of operations performed by an image display control device according to an embodiment.

FIG. 21 is a flow chart illustrating an example of operations performed by image display control device 100 according to an embodiment.

First, image display control device 100 outputs an image data item representing the base image to projecting device 200 (Step S101). Next, image display control device 100 determines whether or not a person entered a range of imaging (Step S102). Specifically, this determination is based on whether or not entry detector 101 detects an entry position. Thus, Step S102 is an entry detecting step in which an entry position through which a person entered a range of imaging is detected based on an image captured by imaging device 300. When image display control device 100 determines no entry (NO in Step S102), image display control device 100 repeats the operations in Step 101 and the following steps. This means that when no entry of a person is detected, the base image is continuously projected. On the other hand, when image display control device 100 determines an entry (YES in Step S102), image display control device 100 identifies a center direction extending from the entry position toward the center position (Step S103). Furthermore, image display control device 100 identifies a directional range that includes the center direction (Step S104).

Next, image display control device 100 identifies, as the entry direction, a representative direction associated with the identified directional range. Furthermore, image display control device 100 identifies an image data item associated with the directional range, for example, with reference to the above-described image list (Step S105). In other words, Step S105 is an entry direction identifying step in which an entry direction in which the person entered the range of imaging is identified based on the entry position detected in the entry detecting step (Step S102) and the center position of the region.

Furthermore, image display control device 100 determines whether or not to perform a rotational rendering process on the identified image data item (Step S106). This determination is based on, for example, whether or not the above-described rotational rendering instruction is received by rotating process instructor 107. When image display control device 100 determines to perform the rotational rendering process (YES in Step S106), image display control device 100 performs the rotational rendering process on the image data item (Step S107). In other words, Step S107 is a rendering step of performing, on the image data item, the rotational rendering process in which an image to be projected by projecting device 200 is rotated according to the entry direction identified in the entry direction identifying step (Step S105).

Subsequently, image display control device 100 starts outputting, to projecting device 200, the image data item on which the rotational rendering process has been performed (Step S108). In other words, Step S108 is an outputting step of outputting, to projecting device 200, the image data item on which the rotational rendering process has been performed in the rendering step (Step S107). With this, for example, a switchable image arranged right-side-up in front of a person who entered the range of imaging is displayed. On the other hand, when image display control device 100 determines not to perform the rotational rendering process (NO in Step S106), image display control device 100 starts outputting the image data item to projecting device 200 without performing the rotational rendering process on the image data item (Step S108). With this, for example, a switchable image not arranged right-side-up in front of a person who entered the range of imaging is displayed.

Then, image display control device 100 determines whether the person has exited the range of imaging (Step S109). This exit determination is based on, for example, the result of tracking an image region determined to include a motion in motion estimation, that is, whether or not the image region is out of the range of imaging. When image display control device 100 determines that the person has exited (YES in Step S109), image display control device 100 stops outputting the image data item of the switchable image and repeats the operations in Step 101 and the following steps. On the other hand, when image display control device 100 determines that the person has not exited (NO in Step S109), image display control device 100 further determines whether or not output of the image data item started in Step S108 has been ended (Step S110). When image display control device 100 determines that the output has been ended (YES in Step S110), image display control device 100 repeats the operations in Step S108 and the following steps. This means that when the switchable image is moving images, the moving images are repetitively displayed. In other words, the switchable image is repeatedly displayed. On the other hand, when image display control device 100 determines that the output has not been ended (NO in Step S110), image display control device 100 determines whether or not an operation to end the projection has been performed (Step S111). When image display control device 100 determines that the operation to end the projection has not been performed (NO in Step S111), image display control device 100 repeats the operations in Step S109 and the following steps. On the other hand, when image display control device 100 determines that the operation to end the projection has been performed (YES in Step S111), image display control device 100 ends the projection or displaying of the image.

[Scheduling]

Figure 22:
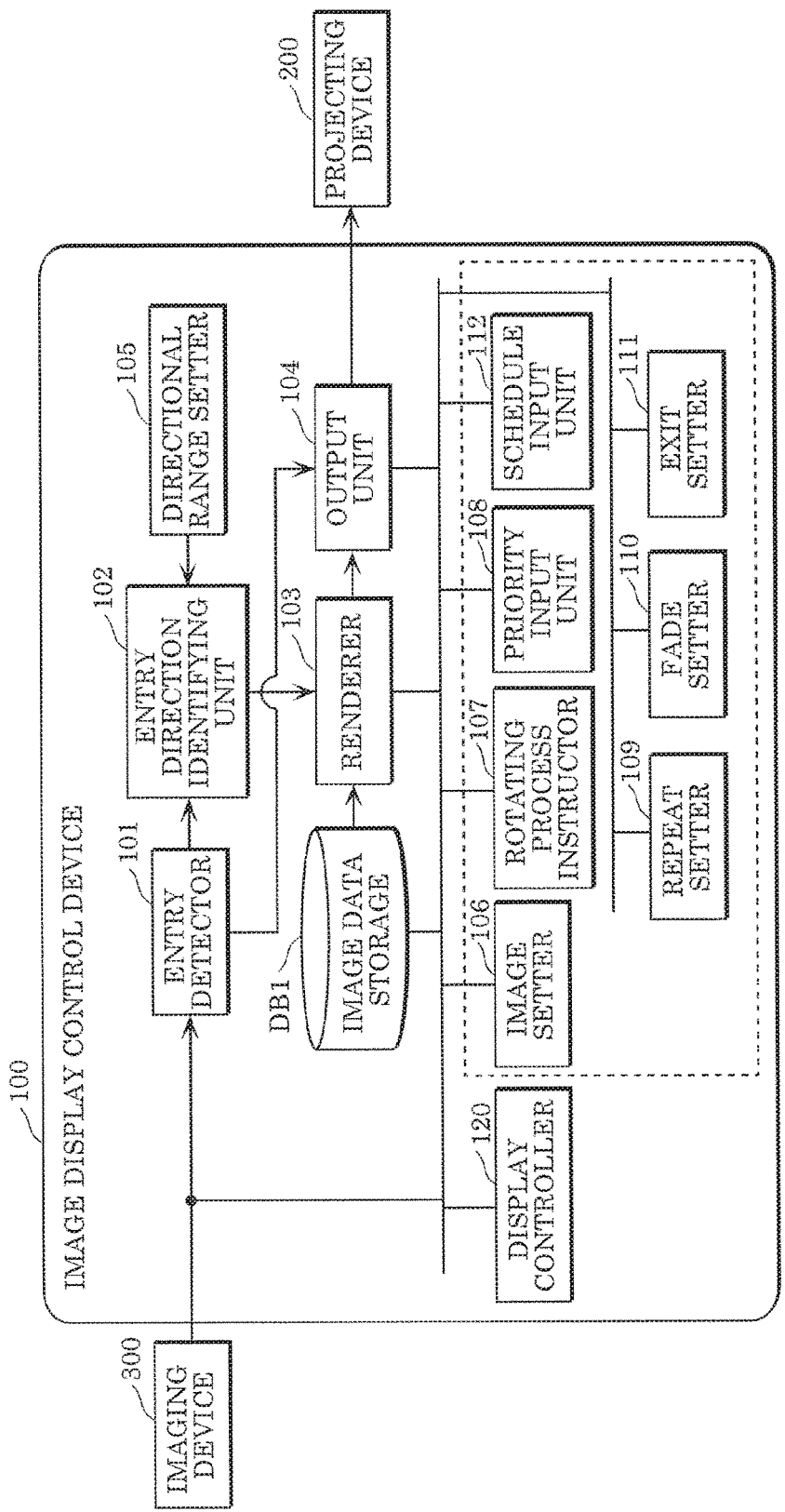
FIG. 22 is a block diagram illustrating another example of a configuration of an image display control device according to an embodiment.

FIG. 22 is a block diagram illustrating another example of a configuration of image display control device 100 according to an embodiment.

Image display control device 100 may further include schedule input unit 112.

Schedule input unit 112 receives an output period in which each image data item is output, in association with the image data item.

Figure 23:
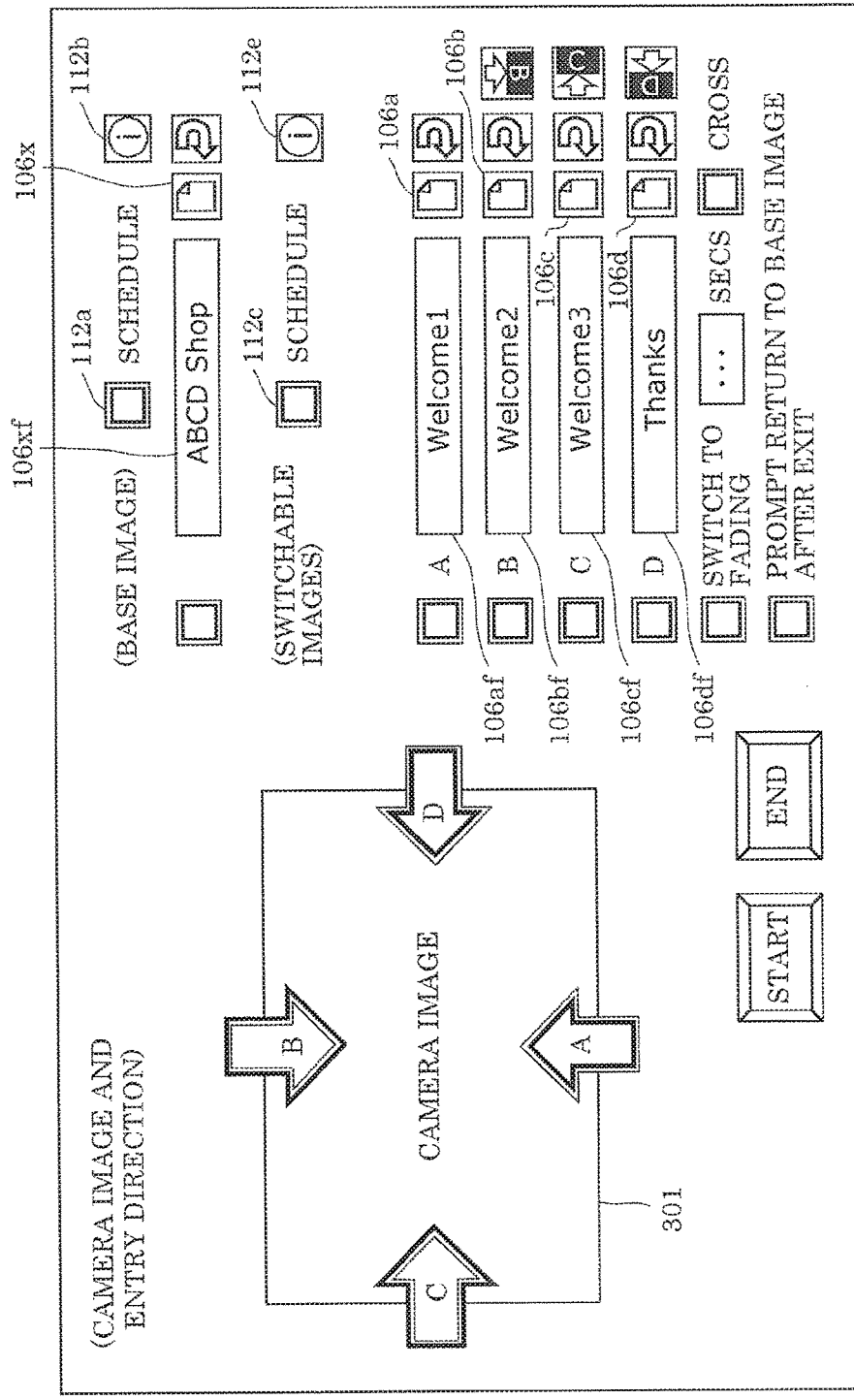
FIG. 23 illustrates another example of a settings screen displayed by a display controller according to an embodiment.

FIG. 23 illustrates another example of the settings screen displayed by display controller 120 according to an embodiment.

Under control of schedule input unit 112, display controller 120 displays, on the settings screen, icons 112b and 112e for receiving an output period. Furthermore, under control of schedule input unit 112, display controller 120 displays, on the settings screen, check boxes 112a and 112c for indicating whether or not the output period is received. Check box 112a and icon 112b are for the base image and are displayed in associated with the base image. Check box 112c and icon 112e are for all the switchable images for four entry directions A to D and are displayed in association with the entirety of entry directions A to D.

When icon 112b is selected, schedule input unit 112 causes display controller 120 to display a calendar, for example. When a period included in the calendar is designated by user input on display controller 120, schedule input unit 112 receives the designated period as the output period for the base image. Accordingly, schedule input unit 112 causes display controller 120 to display a check mark in check box 112a in order to notify a user that the output period has been received. The output period received as just described is applied to an image data item of the base image that has a file name written in file name field 106xf. Assume, for example, that according to user input on display controller 120, image setter 106 selects another image data item as a new image data item of the base image and causes display controller 120 to display a file name of the image data item in file name field 106xf. Also in this case, schedule input unit 112 receives, for the selected new image data item of the base image, an output period in which the image data item is output, as in the above-described case. In this way, schedule input unit 112 receives an output period in which each image data item of the base image is output.

In short, image setter 106 selects an image data item of the base image according to selection on icon 106x. Schedule input unit 112 receives an output period for the selected image data item of the base image. Furthermore, image setter 106 selects a new image data item of the base image according to selection on icon 106x. Schedule input unit 112 receives an output period for the selected new image data item of the base image as well.

When icon 112e is selected, schedule input unit 112 causes display controller 120 to display a calendar, for example, as in the above-described case. When a period included in the calendar is designated by user input on display controller 120, schedule input unit 112 receives the designated period as the output period for the switchable images associated with four directional ranges a to d. Accordingly, schedule input unit 112 causes display controller 120 to display a check mark in check box 112c in order to notify a user that the output period has been received. The output period received as just described is applied to respective image data items of the switchable images that have file names written in file name fields 106af to 106df. Assume, for example, that according to user input on display controller 120, image setter 106 selects other image data items as new image data items of the switchable images and causes display controller 120 to display file names of the image data items in respective file name fields 106af to 106df. Also in this case, schedule input unit 112 receives, for the selected new image data items of the switchable images, an output period in which the image data items are output, as in the above-described case. In this way, schedule input unit 112 receives an output period in which each image data item of the switchable image is output.

In short, image setter 106 selects an image data item of the switchable image according to selection on icons 106a to 106d. Schedule input unit 112 receives an output period for the selected image data item of the switchable image. Furthermore, image setter 106 selects a new image data item of the switchable image according to selection on icons 106a to 106d. Schedule input unit 112 receives an output period for the selected new image data item of the switchable image as well.

When an output period is received for the base image, renderer 103 checks the output period at the time when an image data item of the base image is to be output. When the current time is included in the received output period, renderer 103 outputs the image data item of the base image associated with the received output period to projecting device 200 via output unit 104. On the other hand, when the current time is not included in the received output period, renderer 103 does not output the image data item of the base image.

When an output period is received for the switchable image, renderer 103 checks the output period at the time when an image data item of the switchable image is to be output. When the current time is included in the received output period, renderer 103 outputs the image data item of the switchable image associated with the received output period to projecting device 200 via output unit 104. On the other hand, when the current time is not included in the received output period, renderer 103 does not output the image data item of the switchable image.

As just described, image display control device 100 according to the present embodiment further includes schedule input unit 112 which receives, according to user input, an output period in which each image data item is output, in association with the image data item. Renderer 103 performs the rotational rendering process on the image data item associated with the current output period.

With this, it is possible to project an image appropriate in the current period. For example, an image of a snowy landscape can be projected in winter, and an image of sea bathing can be projected in summer. The output period can be on a monthly, daily, or hourly basis. Therefore, when the output period is on an hourly basis, it is possible that an image of a night view is projected at night between 19 o'clock and 24 o'clock and an image of a sunset is projected in the evening between 16 o'clock and 18 o'clock.

[Switching Between Displaying and Hiding Camera Image]

Figure 24:
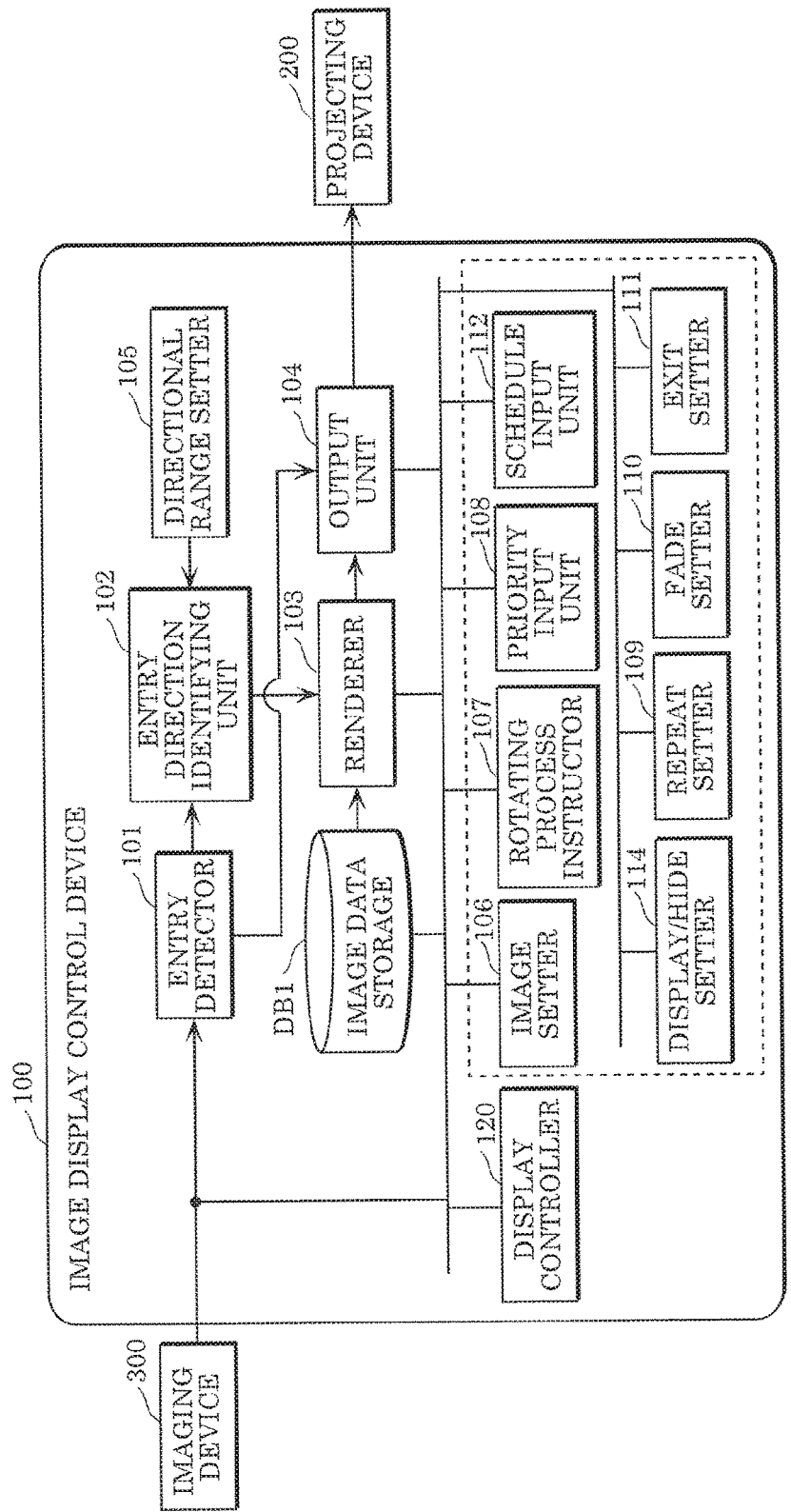
FIG. 24 is a block diagram illustrating another example of a configuration of an image display control device according to an embodiment.

FIG. 24 is a block diagram illustrating another example of a configuration of image display control device 100 according to an embodiment.

Image display control device 100 may further include display/hide setter 114.

Display/hide setter 114 causes display controller 120 to switch between displaying and hiding camera image 301.

Figure 25:
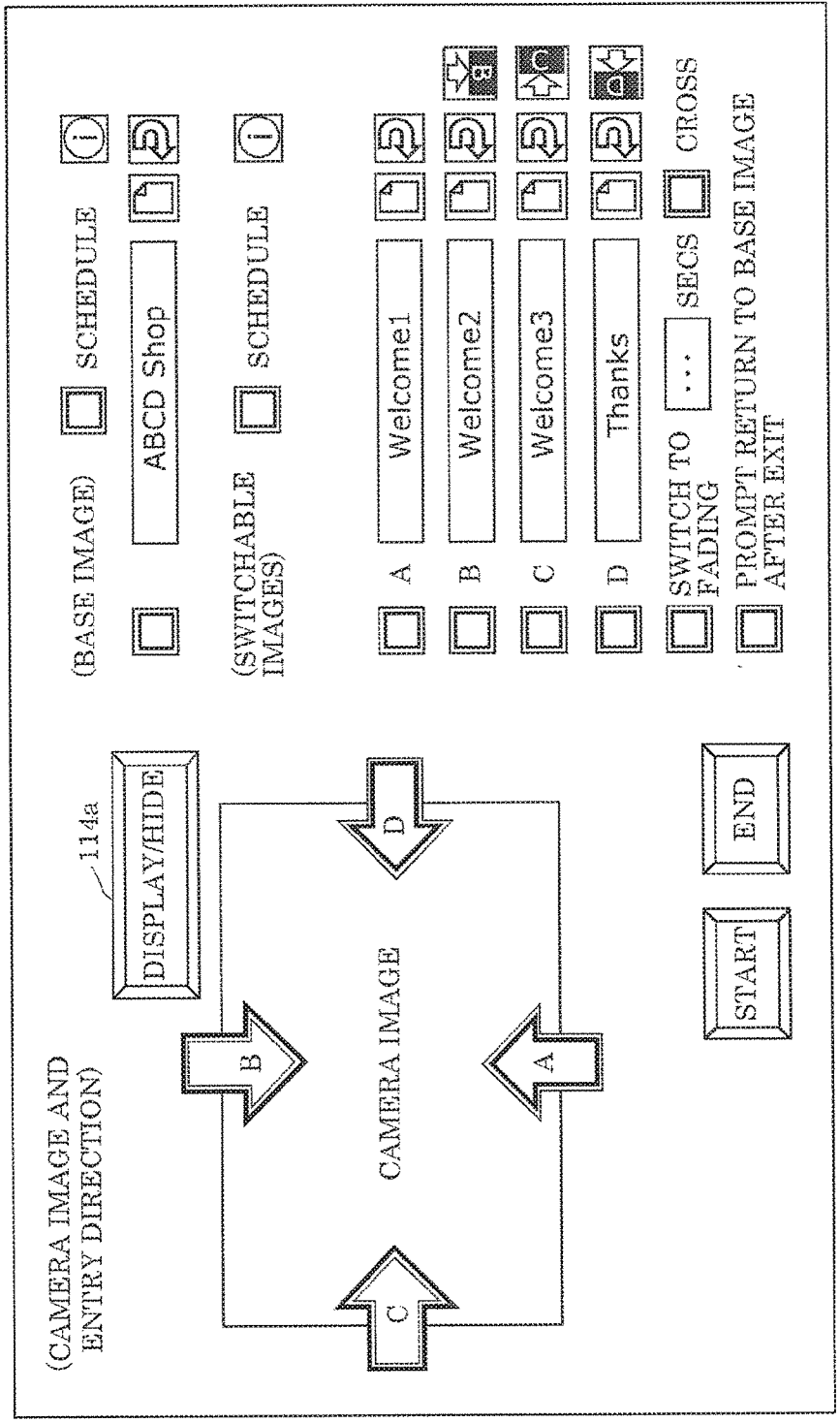
FIG. 25 illustrates another example of a settings screen displayed by a display controller according to an embodiment.

FIG. 25 illustrates another example of the settings screen displayed by display controller 120 according to an embodiment.

Under control of display/hide setter 114, display controller 120 displays, on the settings screen, button 114a for switching between displaying and hiding camera image 301.

When button 114a is pressed, display/hide setter 114 causes display controller 120 to display or hide camera image 301. Specifically, when button 114a is pressed while camera image 301 is being displayed, display/hide setter 114 causes display controller 120 to hide camera image 301. In this case, display controller 120 displays, for example, a uniformly black image without displaying camera image 301. Reversely, when button 114a is pressed while camera image 301 is not being displayed, display/hide setter 114 causes display controller 120 to display camera image 301.

As just described, image display control device 100 according to the present embodiment includes display controller 120 (a display) which displays camera image 301 captured by imaging device 300, and display/hide setter 114 which, according to user input, causes display controller 120 to switch between displaying and hiding camera image 301.

With this, a camera image that is a captured image is displayed to allow a user to check the camera image and a range of imaging. Hiding the camera image will reduce the processing load of image display control device 100, that is, the load for displaying the camera image. If image display control device 100 is a tablet computer or the like low-performance terminal, for example, hiding camera image 301 will prevent other operations in the computer or terminal from slowing down.

[Storing]

Figure 26:
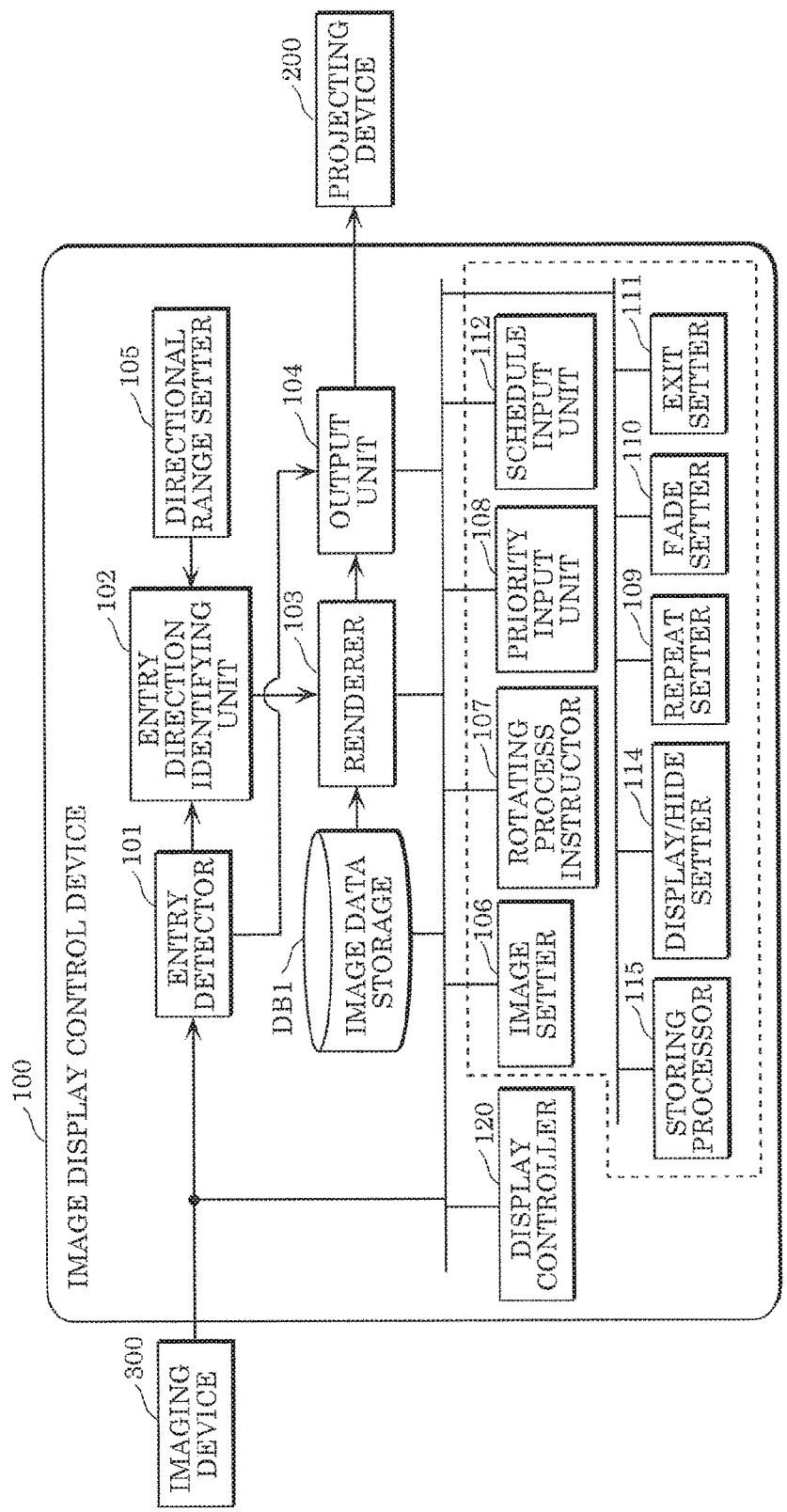
FIG. 26 is a block diagram illustrating another example of a configuration of an image display control device according to an embodiment.

FIG. 26 is a block diagram illustrating another example of a configuration of image display control device 100 according to an embodiment.

Image display control device 100 may further include storing processor 115.

Storing processor 115 receives an instruction to store display processing details received by image display control device 100, and stores the display processing details, for example, into a nonvolatile memory. The display processing details are content received by image setter 106, rotating process instructor 107, priority input unit 108, repeat setter 109, fade setter 110, exit setter 111, and schedule input unit 112.

Figure 27:
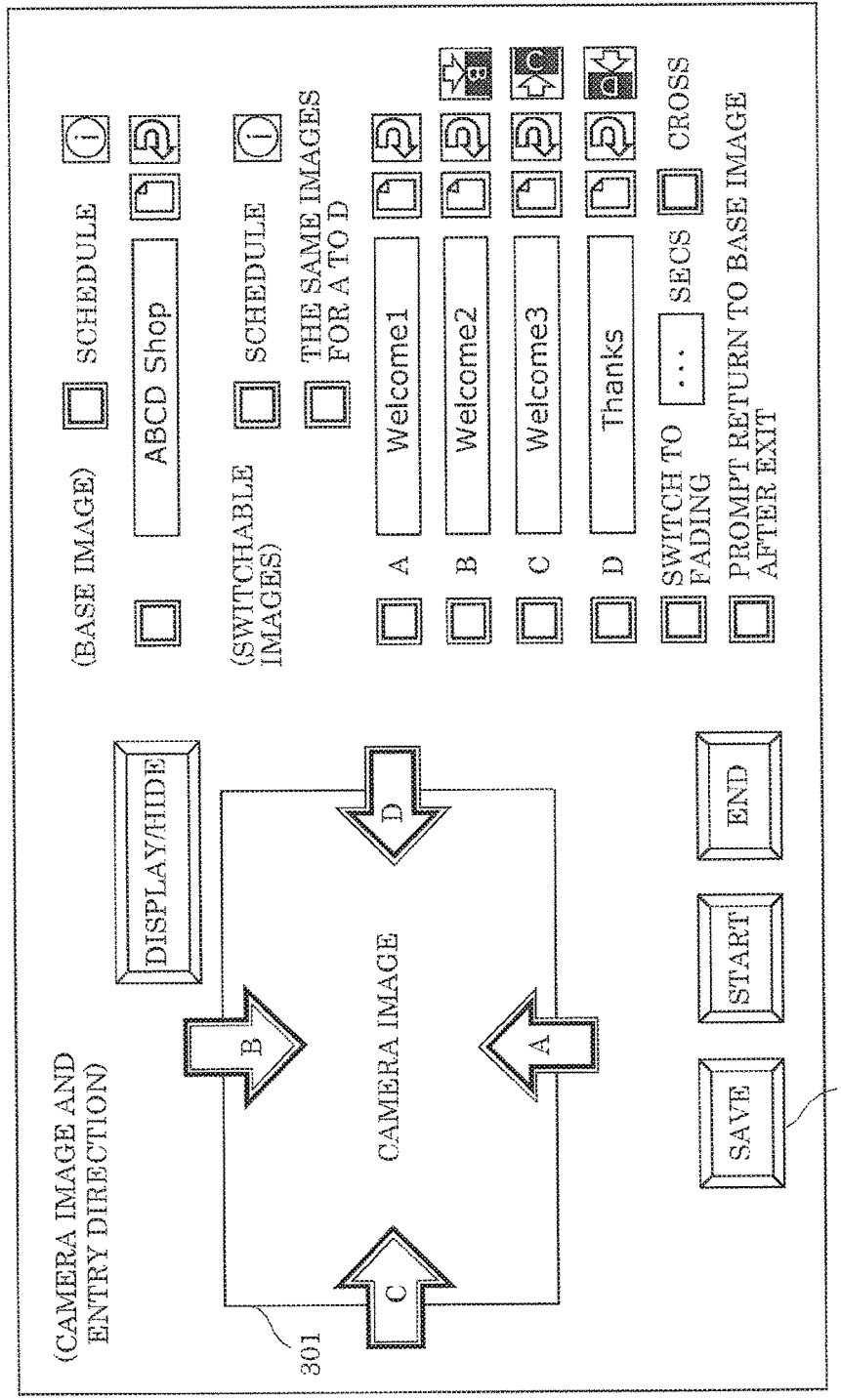
FIG. 27 illustrates another example of a settings screen displayed by a display controller according to an embodiment.

FIG. 27 illustrates another example of the settings screen displayed by display controller 120 according to an embodiment.

Under control of storing processor 115, display controller 120 displays, on the settings screen, button 115a for receiving a storing instruction to store display processing details.

When button 115a is pressed, storing processor 115 receives the storing instruction. Storing processor 115 then stores into a memory all the display processing details that have been received as of the current time. The display processing details stored in this memory are not erased even when image display control device 100 is powered off. Therefore, when the power of image display control device 100 is turned from OFF to ON, renderer 103, output unit 104, and display controller 120 read the stored display processing details from the memory. Renderer 103, output unit 104, and display controller 120 then perform operations based on these display processing details.

As just described, image display control device 100 according to the present embodiment further includes storing processor 115 which stores those received including identification information on an image data item (for example, a file name), a rotational rendering instruction, a priority, a type of fading, or an output period.

With this, for example, when the power of image display control device 100 is turned ON after being once turned OFF, image display control device 100 can operate based on the stored details, meaning that the burden on users for input can be reduced.

[Plural Cameras]

Imaging device 300 according to an embodiment may include a plurality of cameras.

Figure 28A:
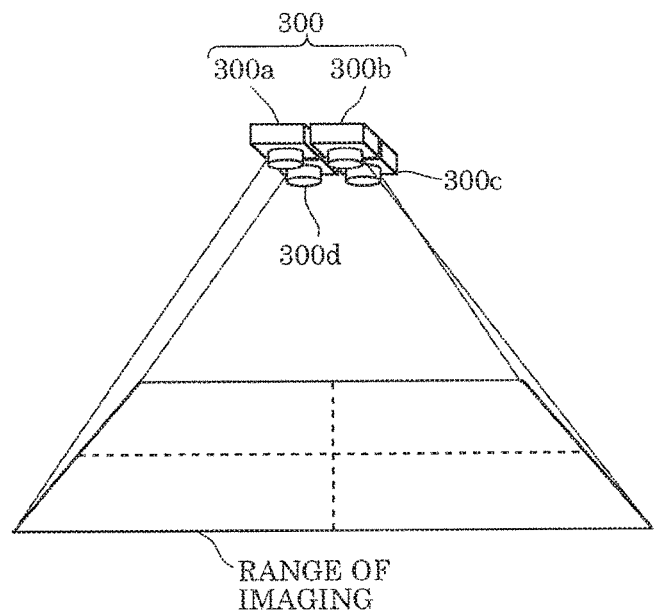
FIG. 28A illustrates an example of a range of imaging which is captured by a plurality of cameras according to an embodiment.

FIG. 28A illustrates an example of a range of imaging which is captured by a plurality of cameras according to an embodiment.

For example, four cameras 300a to 300d capture respective images of sectioned ranges each of which is in the shape of a rectangle on the projection surface. These sectioned ranges captured by cameras 300a to 300d are adjacent to each other without overlap. Image display control device 100 handles, as the above-described range of imaging, an entire range including these four sectioned ranges. This means that based on a camera image made up of four images captured by respective four cameras 300a to 300d, entry detector 101 detects an entry position through which a person entered a range of imaging made up of four sectioned ranges.

Figure 28B:
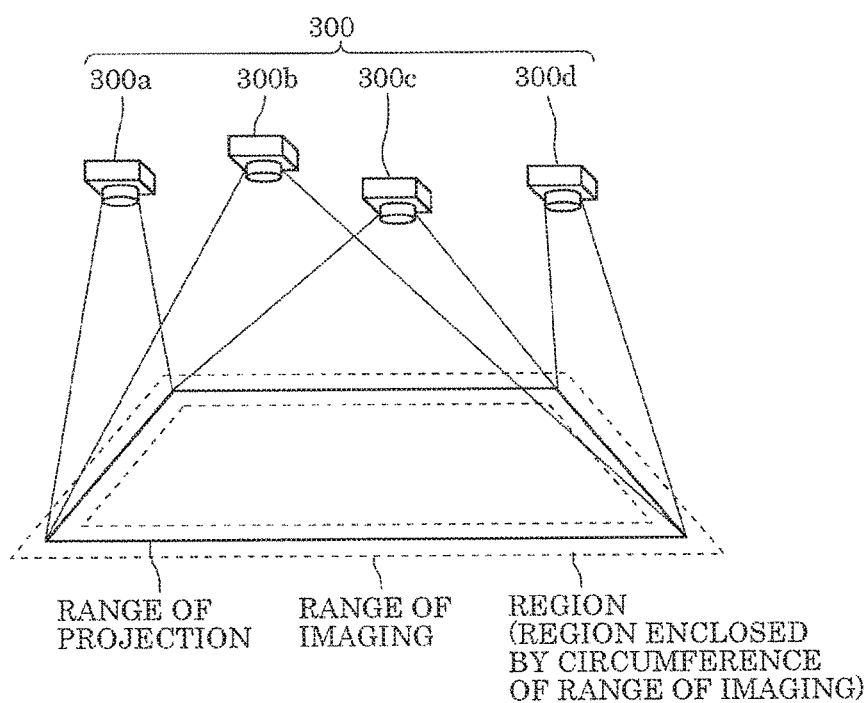
FIG. 28B illustrates another example of a range of imaging which is captured by a plurality of cameras according to an embodiment.

FIG. 28B illustrates another example of a range of imaging which is captured by a plurality of cameras according to an embodiment.

For example, four cameras 300a to 300d capture respective images of edge portions of the range of projection. Specifically, camera 300a captures an image of a sectioned range including one side of a rectangular range of projection, camera 300d captures an image of a sectioned range including the side of the rectangular range of projection opposite the one side, camera 300b captures an image of a sectioned range including a remaining side of the rectangular range of projection, and camera 300d captures an image of a sectioned range including the side of the rectangular range of projection opposite the remaining side.

Image display control device 100 handles, as the above-described range of imaging, a frame-shaped range made up of these four sectioned ranges (the range enclosed by dotted lines in FIG. 28B). This means that based on a camera image made up of four images captured by respective four cameras 300a to 300d, entry detector 101 detects an entry position through which a person entered a range of imaging made up of four sectioned ranges. In this case, a center position for identifying an entry direction is the center of a region enclosed by the circumference of the range of imaging.

Figure 29A:
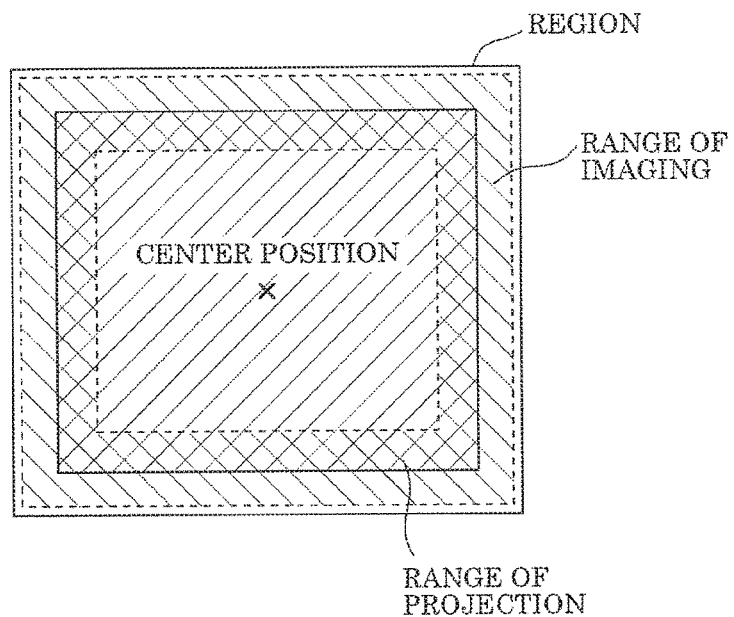
FIG. 29A illustrates an example of the positional relationship between a range of imaging, a range of projection, and a center position according to an embodiment.

FIG. 29A illustrates an example of the positional relationship between a range of imaging, a range of projection, and a center position according to an embodiment.

For example, in the case where images are captured by cameras 300a to 300d illustrated in FIG. 28B, the range of imaging is a frame-shaped range (the range enclosed by dotted lines in FIG. 29A) as described above. This range of imaging includes edge portions of the range of projection. In this case, a center position for identifying an entry direction is the center of a region enclosed by the circumference of the range of imaging. This region may be larger than the range of projection as long as it includes the range of projection. The range of imaging does not need to include the range of projection unlike the illustration of, for example, FIG. 1; it is sufficient that the range of imaging is at least a part of a region including the range of projection. Even with the positional relationship between the range of imaging, the range of projection, and the center position, image display system 10 and image display control device 100 according to the present embodiment are capable of appropriately identifying an entry direction in which a person entered the range of imaging. As a result, an image to be projected can be properly rotated according to the entry direction.

Figure 29B:
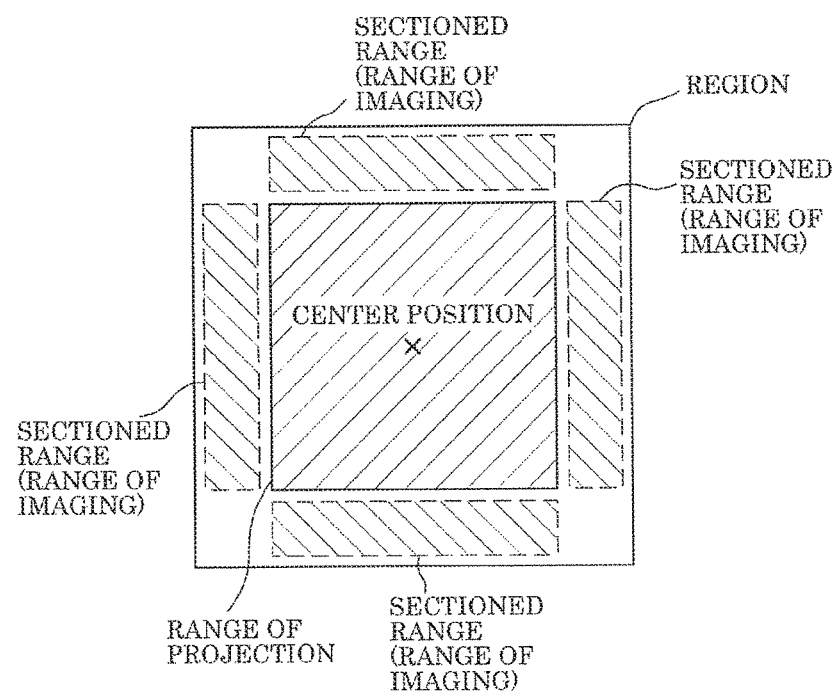
FIG. 29B illustrates another example of the positional relationship between a range of imaging, a range of projection, and a center position according to an embodiment.

FIG. 29B illustrates another example of the positional relationship between a range of imaging, a range of projection, and a center position according to an embodiment.

For example, cameras 300a to 300d may capture images of sectioned ranges that are independently of each other as illustrated in FIG. 29B. Furthermore, these sectioned ranges do not need to overlap with the range of projection. In detail, cameras 300a to 300d capture respective images of sectioned ranges that are located opposite each other and away from the sides of a rectangular range of projection. These four independent, sectioned ranges are handled as the above-described range of imaging. In this case, a center position for identifying an entry direction is the center of a region that includes the range of projection and surrounds the four sectioned ranges. Even with the positional relationship between the range of imaging, the range of projection, and the center position, image display system 10 and image display control device 100 according to the present embodiment are capable of appropriately identifying an entry direction in which a person entered the range of imaging. As a result, an image to be projected can be properly rotated according to the entry direction. Moreover, image display control device 100 may receive the region according to user input on display controller 120, and determine a center position for identifying an entry direction.

In this way, the use of a plurality of cameras makes it possible to capture an image of a wide range, that is, allows the range of imaging to be wide.

Although the image display control device and the image display system according to an embodiment have been described above, the present disclosure is not limited to the embodiment. Those skilled in the art will readily appreciate that various modifications may be made in the embodiment and that other embodiments may be obtained by arbitrarily combining the structural elements in the embodiment and modifications without materially departing from the essence of the appended Claims, and the appended Claims are of a scope intended to cover and encompass these modified or combined embodiments.

For example, although image display system 10 according to the present embodiment includes projecting device 200, projecting device 200 may be replaced by a panel display or the like. The panel display is, for example, a liquid-crystal display or a plasma display, and is embedded in or placed on a floor surface, etc. In the present embodiment, even when the panel display is used, an image to be displayed on the panel display can be properly rotated according to an entry direction in which a person entered the range of imaging.

Furthermore, although an image is projected and an image is captured downward from above in the vertical direction in the present embodiment, an image may be projected and an image may be captured in the opposite direction, that is, upward from below in the vertical direction. Alternatively, an image may be captured in a direction oblique to the vertical direction in which an image is projected. Furthermore, the method of detecting, based on a camera image, an entry position through which a person entered the range of imaging is not limited to the method involving motion estimation, an entry position through which a person entered the range of imaging may be detected through other means such as edge detection, feature point extraction, and pattern matching. Moreover, the entry position subject to detection is not limited to an entry position through which a person entered the range of imaging and may be an entry position through which an animal entered the range of imaging.

Although an image data item is previously stored in image data storage DB1 in the present embodiment, image display control device 100 may include a generator that generates the image data item.

Furthermore, although image display control device 100 is a personal computer in the present embodiment, image display control device 100 may be a tablet computer or a mobile device such as a smartphone.

In the present embodiment, image display control device 100 may be wired or wirelessly connected to projecting device 200 and imaging device 300, optionally through a network.

Furthermore, in the present embodiment, when the above-described rotational rendering instruction has been received, display controller 120 may receive an instruction on a rotation direction in which an image is to be rotated. This means that image display control device 100 according to the present embodiment is for causing projecting device 200 to display an image, and includes display controller 120 which receives an instruction on the image. Display controller 120 receives at least one of an instruction to select an image that is to be projected according to an entry direction in which a person moved, an instruction on whether or not to perform a rotational rendering process on the image that is to be projected according to the entry direction in which the person moved, an instruction on a rotational direction in which the image is to be rotated in the rotational rendering process, an instruction on whether or not to repetitively display the image that is to be projected according to the entry direction in which the person moved, and an instruction on an output period in which an image to be displayed is output.

Note that in the above embodiment, each of the structural elements included in image display control device 100 illustrated in FIG. 2, FIG. 5, FIG. 7, FIG. 10, FIG. 13, FIG. 15, FIG. 17, FIG. 19, FIG. 22, FIG. 24, and FIG. 26 may be constituted by dedicated hardware, or may be realized by executing a software program suitable for the structural element. Each of the structural elements may be realized by a program executing unit such as a CPU or a processor reading and executing the software program recorded in a recording medium such as a hard disk or semiconductor memory.

Furthermore, an embodiment disclosed herein may be implemented as an image display control method.

FIG. 30A to FIG. 30E are flowcharts illustrating image display control methods according to respective embodiments of the present disclosure.

An image display control method according to the first aspect of the present disclosure is for displaying an image using a projecting device and an imaging device. The projecting device obtains an image data item and projects onto a projection surface an image represented by the image data item. The imaging device captures, as a range of imaging, an image of at least a part of a region on the projection surface which includes a range of projection in which the image appears.

Figure 30A:
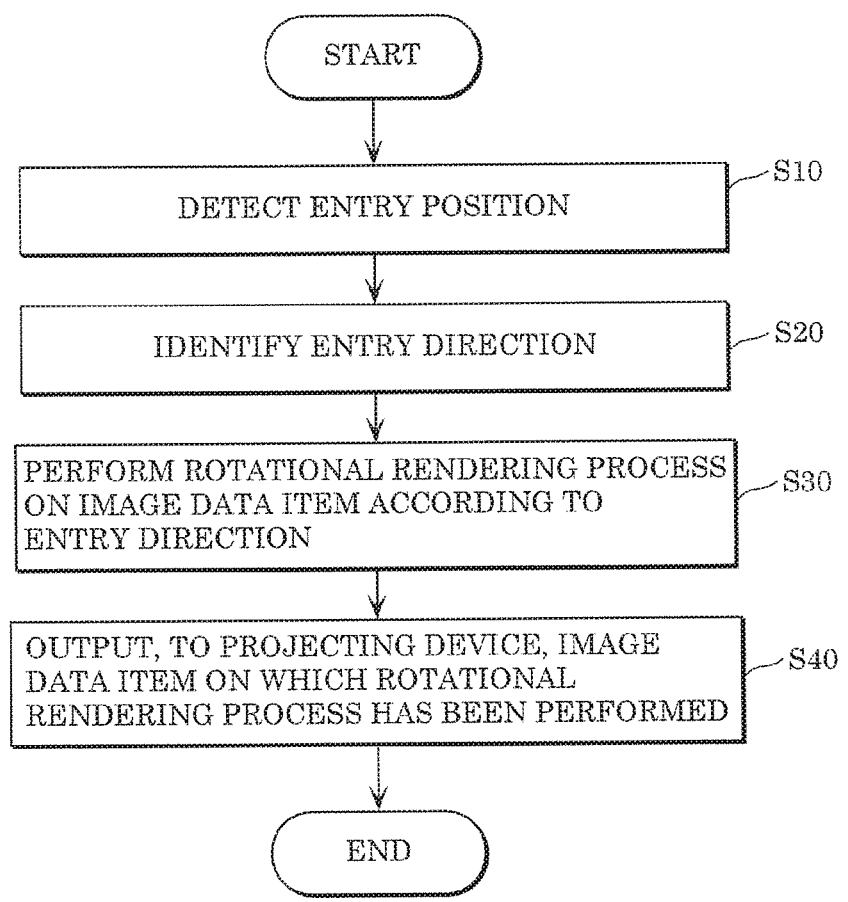
FIG. 30A is a flowchart illustrating an image display control method according to a first aspect of the present disclosure.

In the above image display control method according to the first aspect, as illustrated in FIG. 30A, first, an entry position through which a person entered the range of imaging is detected based on the image captured by the imaging device (Step S10). Next, an entry direction in which a person entered the range of imaging is identified based on the entry position detected in Step S10 and a center position of the region (Step S20). Next, a rotational rendering process in which the image to be projected by the projecting device is rotated is performed on the image data item according to the entry direction identified in Step S20 (Step S30). Next, the image data item on which the rotational rendering process has been performed in Step S30 is output to the projecting device (Step S40).

Figure 30B:
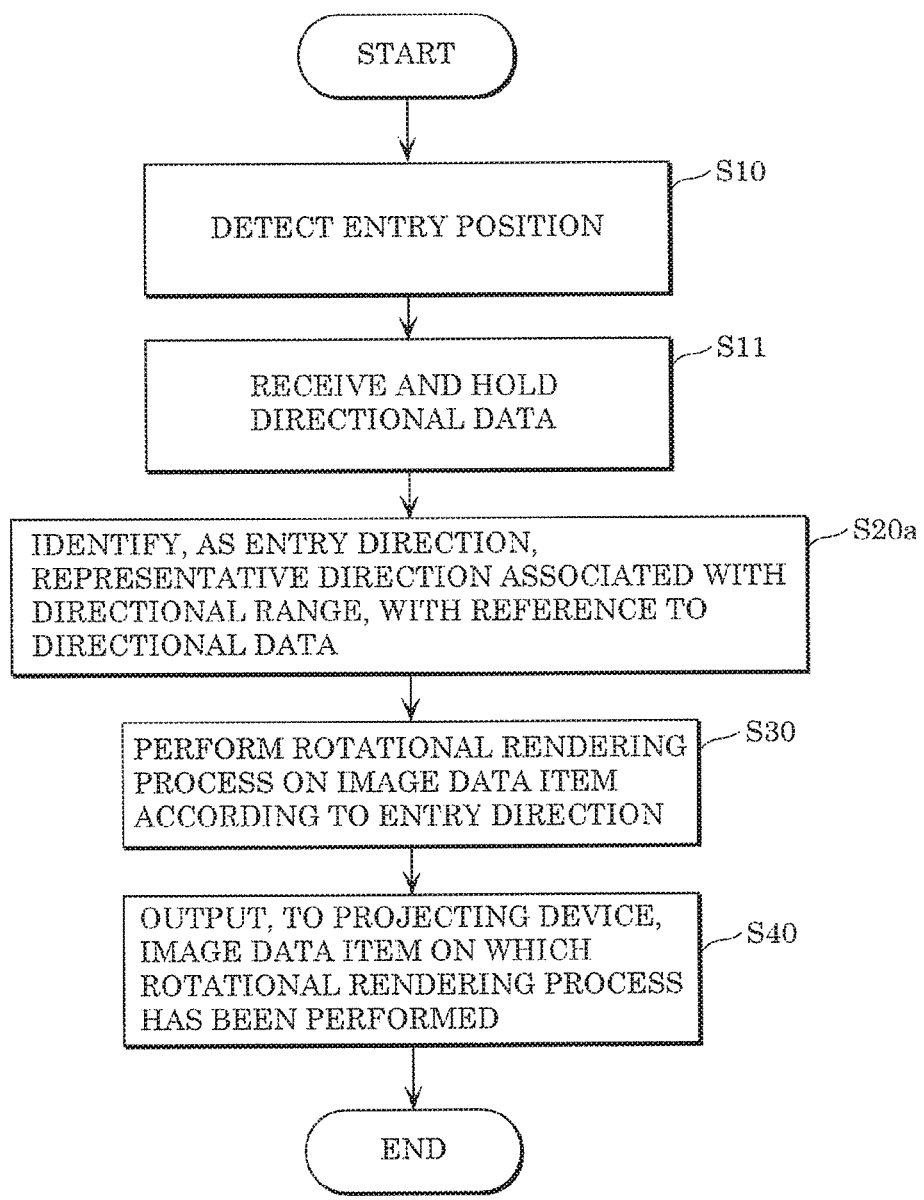
FIG. 30B is a flowchart illustrating an image display control method according to a second aspect of the present disclosure.

An image display control method according to the second aspect of the present disclosure includes Step S11 in addition to the steps included in the image display control method according to the first aspect, as illustrated in FIG. 30B. In this Step S11, directional data indicating a plurality of directional ranges on the projection surface which spread from the center position, and representative directions respectively associated with the plurality of directional ranges is received and held. Step S20a in the image display control method according to the second aspect corresponds to Step S20 in the image display control method according to the first aspect. In this Step S20a, a representative direction associated with a directional range that includes a center direction extending from the entry position toward the center position is identified as the entry direction with reference to the directional data received in Step S11.

Figure 30C:
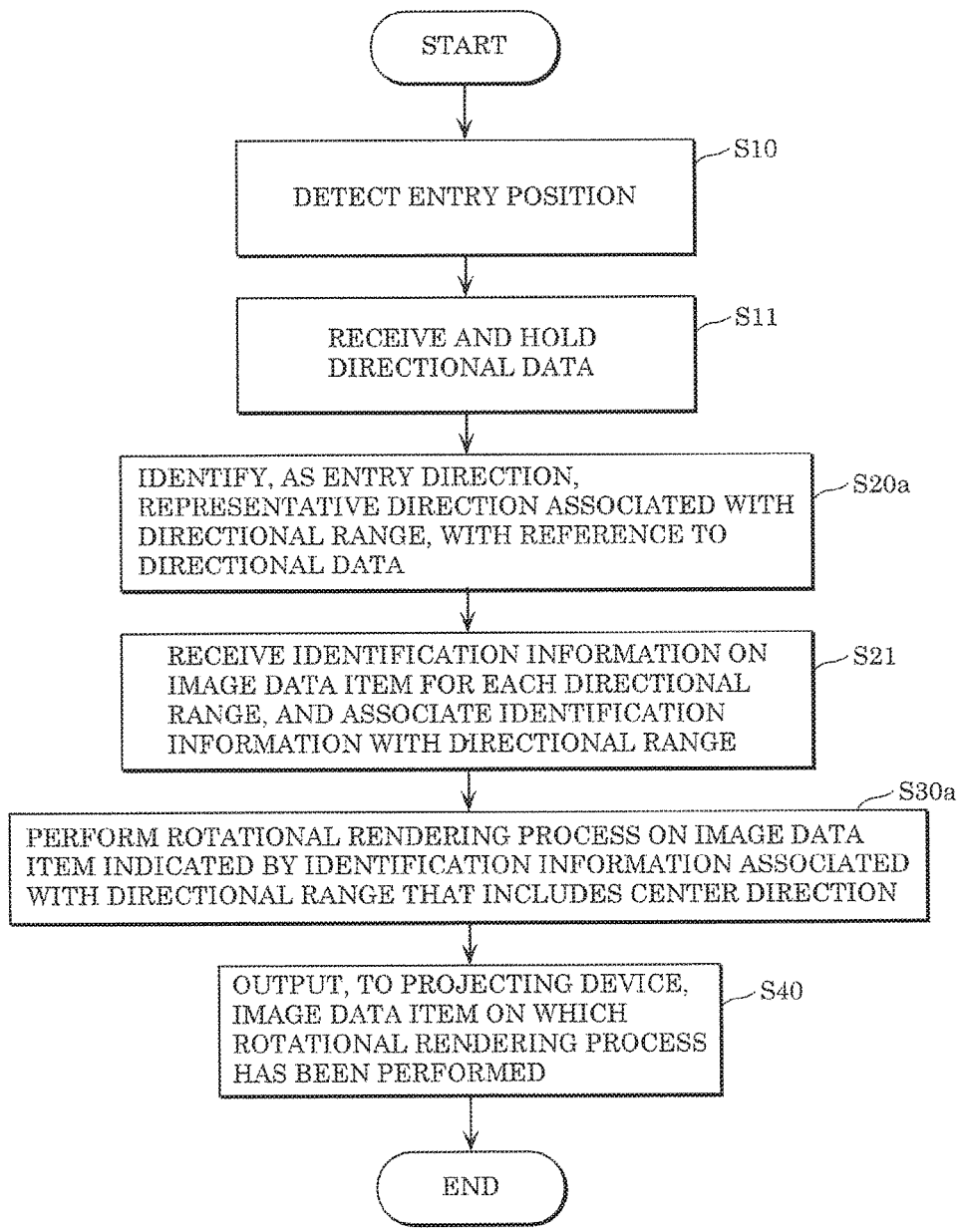
FIG. 30C is a flowchart illustrating an image display control method according to a third aspect of the present disclosure.

An image display control method according to the third aspect of the present disclosure includes Step S21 in addition to the steps included in the image display control method according to the second aspect, as illustrated in FIG. 30C. In Step S21, identification information on an image data item stored on a recording medium is received for each of the plurality of directional ranges, and the identification information is associated with the directional range. Step S30a in the image display control method according to the third aspect corresponds to Step S30 in the image display control method according to the second aspect. In this Step S30a, the rotational rendering process is performed on the image data item indicated by the identification information associated with the directional range that includes the center direction.

Figure 30D:
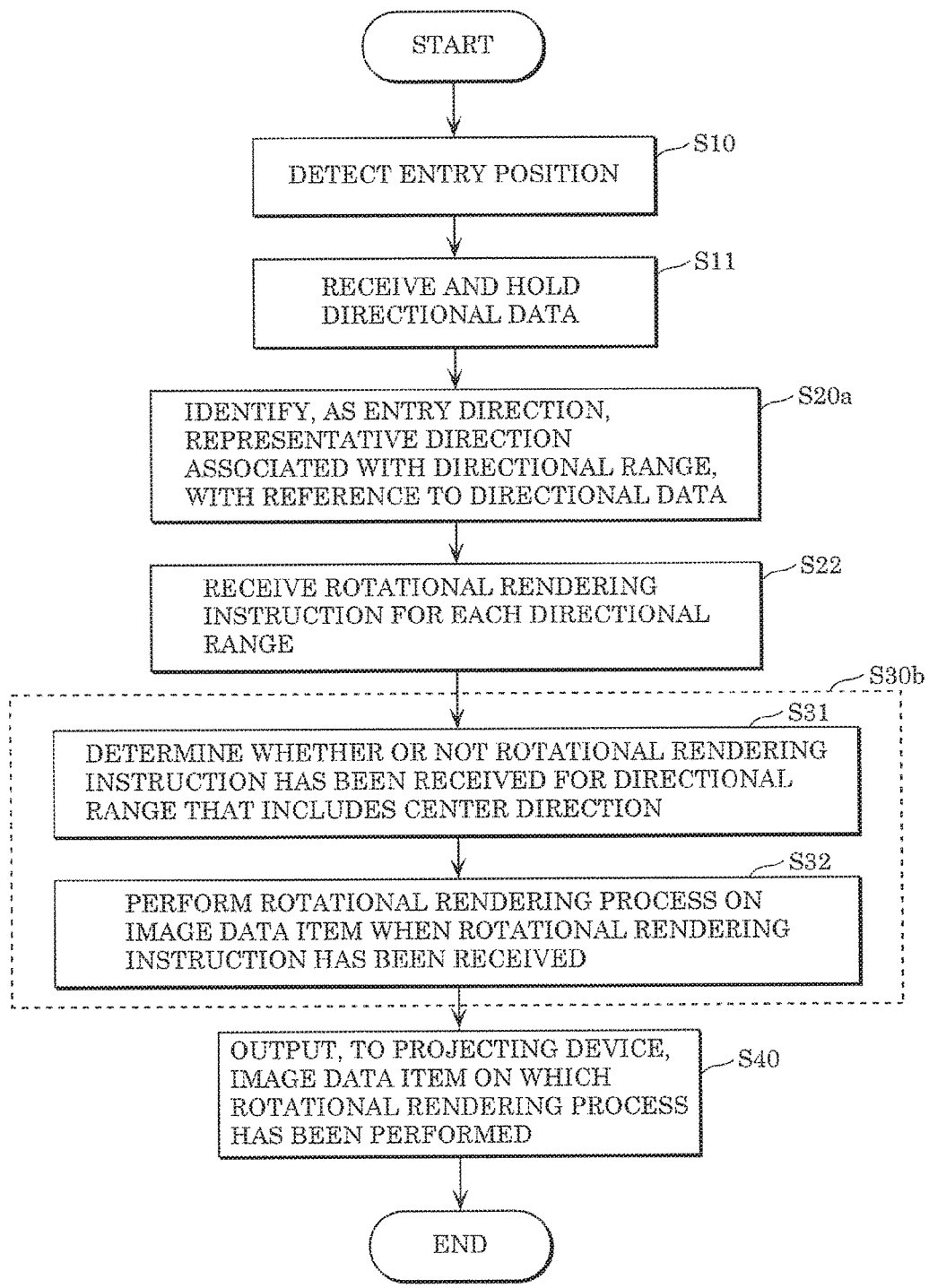
FIG. 30D is a flowchart illustrating an image display control method according to a fourth aspect of the present disclosure.

An image display control method according to the fourth aspect of the present disclosure includes Step S22 in addition to the steps included in the image display control method according to the second aspect, as illustrated in FIG. 30D. In Step S22, a rotational rendering instruction to perform the rotational rendering process is received for each of the plurality of directional ranges. Step S30b in the image display control method according to the fourth aspect corresponds to Step S30 in the image display control method according to the second aspect. This Step S30b includes Step S31 and Step S32. In Step S31, whether or not the rotational rendering instruction has been received for the directional range that includes the center direction is determined. In Step S32, when it is determined that the rotational rendering instruction has been received, the rotational rendering process is performed on the image data item.

Figure 30E:
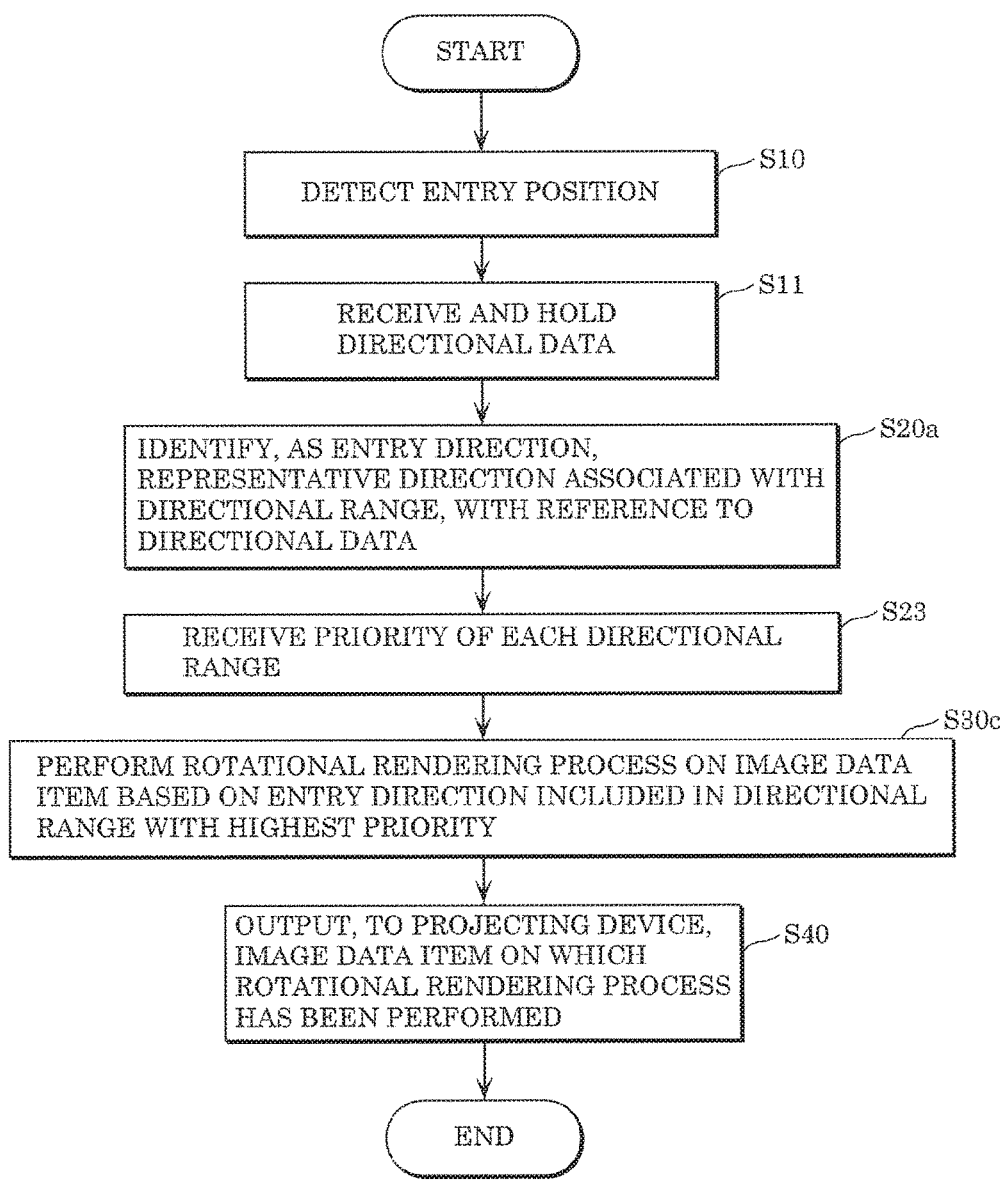
FIG. 30E is a flowchart illustrating an image display control method according to a fifth aspect of the present disclosure.

An image display control method according to the fifth aspect of the present disclosure includes Step S23 in addition to the steps included in the image display control method according to the second aspect, as illustrated in FIG. 30E. In Step S23, a priority of each of the plurality of directional ranges is received. Step S30c in the image display control method according to the fifth aspect corresponds to Step S30 in the image display control method according to the second aspect. In Step S30c, when a plurality of entry directions are identified during a predetermined period in Step S20a, the rotational rendering process is performed based on an entry direction included in a directional range with the highest priority among directional ranges respectively associated with the plurality of entry directions identified.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An image display control device for displaying an image using a projecting device and an imaging device, the projecting device obtaining an image data item and projecting onto a projection surface an image represented by the image data item, the imaging device capturing an image of at least a part of a region on the projection surface as a range of imaging, the region including a range of projection in which the image appears, the image display control device comprising:
   a processor; and
   a non-transitory memory having stored thereon executable instructions, which when executed by the processor, cause the processor to:
      detect, based on the image captured by the imaging device, an entry position through which a person entered the range of imaging;
      identify, based on the detected entry position and a center position of the region, an entry direction in which the person entered the range of imaging;
      perform on the image data item a rotational rendering process in which the image to be projected by the projecting device is rotated according to the identified entry direction; and
      output to the projecting device the image data item on which the rotational rendering process has been performed.

2. The image display control device according to claim 1, wherein the imaging device captures an image of the region as the range of imaging.

3. The image display control device according to claim 1, wherein the instructions further cause the processor to receive and hold directional data indicating a plurality of directional ranges on the projection surface which spread from the center position, and representative directions respectively associated with the plurality of directional ranges, and
   in the identifying of an entry direction, a representative direction associated with a directional range that includes a center direction extending from the entry position toward the center position is identified as the entry direction with reference to the received directional data.

4. The image display control device according to claim 3, wherein the instructions further cause the processor to receive, for each of the plurality of directional ranges, identification information on an image data item stored on a recording medium, and associate the identification information with the directional range, and
   in the performing of a rotational rendering process on the image data item, the rotational rendering process is performed on the image data item indicated by the identification information associated with the directional range that includes the center direction.

5. The image display control device according to claim 3, wherein the instructions further cause the processor to
receive, for each of the plurality of directional ranges, a rotational rendering instruction to perform the rotational rendering process, and
in the performing of a rotational rendering process on the image data item, whether or not the rotational rendering instruction has been received for the directional range that includes the center direction is determined, and when it is determined that the rotational rendering instruction has been received, the rotational rendering process is performed on the image data item.

6. The image display control device according to claim 3, wherein the instructions further cause the processor to
receive a priority of each of the plurality of directional ranges, and
in the performing of a rotational rendering process on the image data item, when a plurality of entry directions are identified during a predetermined period in the identifying of an entry direction, the rotational rendering process is performed based on an entry direction included in a directional range with a highest priority among directional ranges respectively associated with the plurality of entry directions identified.

7. The image display control device according to claim 1, wherein in the detecting of an entry position, whether or not the person who entered the range of imaging has exited the range of imaging is determined, and
in the outputting of the image data item, when it is determined that the person has not exited at the time the output of the image data item is ended, the output of the image data item to the projecting device is resumed.

8. The image display control device according to claim 1, wherein in the outputting of the image data item, when a new entry position is detected while the image data item is being output, the image data item is switched to a new image data item on which the rotational rendering process has been performed according to the new entry position, and the new image data item is output, the image data item representing an image fading out, the new image data item representing an image fading in.

9. The image display control device according to claim 8, wherein the instructions further cause the processor to
receive a type of fading according to user input, the type of fading being one of: cross-fade having a period of overlap between the image represented by the image data item and the image represented by the new image data item; and non-cross-fade not having the period of overlap, and
in the outputting of the image data item, the image data item is switched to the new image data item and the new image data item is output in accordance with the received type of fading.

10. The image display control device according to claim 1,
wherein in the detecting of an entry position, whether or not the person who entered the range of imaging has exited the range of imaging is determined, and
in the outputting of the image data item, when it is determined that the person has exited the range of imaging while the image data item is being output to the projecting device, the output of the image data item to the projecting device is stopped.

11. The image display control device according to claim 1,
wherein the instructions further cause the processor to
receive, according to user input, an output period in which each image data item is output, in association with the image data item, and
in the performing of a rotational rendering process on the image data item, the rotational rendering process is performed on an image data item associated with a current output period.

12. The image display control device according to claim 1, further comprising
a display that displays the image captured by the imaging device,
wherein the instructions further cause the processor to, according to user input, cause the display to switch between displaying and hiding the image.

13. The image display control device according to claim 4,
wherein the instructions further cause the processor to store one of the identification information on the image data item, a rotational rendering instruction, a priority, a type of fading, and an output period.

14. The image display control device according to claim 1,
wherein in the identifying of an entry direction, a center direction extending from the entry position toward the center position is identified as the entry direction.

15. An image display system comprising:
a projecting device;
an imaging device; and
an image display control device,
the projecting device obtaining an image data item and projecting onto a projection surface an image represented by the image data item,
the imaging device capturing an image of at least a part of a region on the projection surface as a range of imaging, the region including a range of projection in which the image appears, and
the image display control device including:
a processor; and
a non-transitory memory having stored thereon executable instructions, which when executed by the processor, cause the processor to:
detect, based on the image captured by the imaging device, an entry position through which a person entered the range of imaging;
identify, based on the detected entry position and a center position of the region, an entry direction in which the person entered the range of imaging;
perform on the image data item a rotational rendering process in which the image to be projected by the projecting device is rotated according to the identified entry direction; and
output to the projecting device the image data item on which the rotational rendering process has been performed.

16. An image display control method for displaying an image using a projecting device and an imaging device, the projecting device obtaining an image data item and projecting onto a projection surface an image represented by the image data item, the imaging device capturing an image of at least a part of a region on the projection surface as a range of imaging, the region including a range of projection in which the image appears, the image display control method comprising:
detecting, based on the image captured by the imaging device, an entry position through which a person entered the range of imaging;

identifying, based on the entry position detected in the detecting and a center position of the region, an entry direction in which the person entered the range of imaging;

performing on the image data item a rotational rendering process in which the image to be projected by the projecting device is rotated according to the entry direction identified in the identifying; and outputting to the projecting device the image data item on which the rotational rendering process has been performed in the performing.

* * * * *